(12) United States Patent
Steele et al.

(10) Patent No.: US 9,253,009 B2
(45) Date of Patent: Feb. 2, 2016

(54) HIGH PERFORMANCE STATION

(75) Inventors: Gregory C. Steele, Freemont, CA (US); D. J. Richard van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 959 days.

(21) Appl. No.: 11/966,651

(22) Filed: Dec. 28, 2007

(65) Prior Publication Data

US 2008/0165874 A1    Jul. 10, 2008

Related U.S. Application Data

(60) Provisional application No. 60/883,733, filed on Jan. 5, 2007.

(51) Int. Cl.
*H04K 1/10* (2006.01)
*H04L 27/38* (2006.01)
(Continued)

(52) U.S. Cl.
CPC .......... *H04L 27/3863* (2013.01); *H04L 1/0026* (2013.01); *H04L 1/206* (2013.01); *H04L 25/0204* (2013.01); *H04L 25/061* (2013.01); *H04B 7/0413* (2013.01); *H04L 1/0003* (2013.01); *H04L 1/0009* (2013.01); *H04L 25/0216* (2013.01); *H04L 27/2647* (2013.01); *H04L 2025/03426* (2013.01); *H04L 2027/0016* (2013.01)

(58) Field of Classification Search
CPC ............. H04L 27/3863; H04L 25/061; H04L 25/0204; H04L 1/206; H04L 1/0026; H04L 2025/03426; H04L 27/2647; H04L 25/0216; H04L 1/0003; H04L 1/0009; H04L 2027/0016; H04B 7/0413

USPC ......... 375/261, 360, 260, 262, 265, 340, 343, 375/346, 347; 370/203, 204, 208, 209
See application file for complete search history.

(56) References Cited

U.S. PATENT DOCUMENTS

| 4,555,790 A | 11/1985 | Betts et al. |
| 5,369,411 A | 11/1994 | Lisle, Jr. |

(Continued)

FOREIGN PATENT DOCUMENTS

| EP | 1422894 A1 | 5/2004 |
| EP | 1434381 A1 | 6/2004 |

(Continued)

OTHER PUBLICATIONS

International Search Report and Written Opinion—PCT/US2008/050058, International Search Authority—European Patent Office—Aug. 21, 2008.

(Continued)

*Primary Examiner* — Dhaval Patel
(74) *Attorney, Agent, or Firm* — Kevin T. Cheatham

(57) ABSTRACT

Systems and methodologies are described for processing information at a device operating in a wireless communication system. Techniques for in-phase and quadrature (I/Q) calibration, interference cancellation, channel estimation, and signal-to-noise ratio (SNR) and rank metric calculation are provided herein. As provided herein, one or more of the described techniques can be used to adjust the performance of a wireless station in the presence of impairments to the wireless station and/or a communication link used by the wireless station.

45 Claims, 17 Drawing Sheets

(51) Int. Cl.
*H04L 1/20* (2006.01)
*H04L 25/02* (2006.01)
*H04L 25/06* (2006.01)
*H04B 7/04* (2006.01)
*H04L 1/00* (2006.01)
*H04L 27/26* (2006.01)
*H04L 25/03* (2006.01)
*H04L 27/00* (2006.01)

(56) References Cited

U.S. PATENT DOCUMENTS

| | | | |
|---|---|---|---|
| 5,568,523 A | 10/1996 | Tsujimoto | |
| 5,852,630 A | 12/1998 | Langberg et al. | |
| 5,889,488 A | 3/1999 | Kosaki | |
| 6,028,894 A | 2/2000 | Oishi et al. | |
| 6,470,047 B1* | 10/2002 | Kleinerman et al. | 375/232 |
| 7,068,743 B1* | 6/2006 | Suzuki | 375/345 |
| 7,280,619 B2* | 10/2007 | Nemer et al. | 375/323 |
| 7,324,584 B1* | 1/2008 | Vigneron et al. | 375/150 |
| 7,428,269 B2 | 9/2008 | Sampath et al. | |
| 7,545,867 B1* | 6/2009 | Lou et al. | 375/259 |
| 8,096,683 B1* | 1/2012 | Burrell, IV | 362/249.02 |
| 2002/0196871 A1* | 12/2002 | Nishio et al. | 375/322 |
| 2003/0206603 A1 | 11/2003 | Husted | |
| 2003/0206630 A1 | 11/2003 | Rarick | |
| 2003/0218973 A1* | 11/2003 | Oprea et al. | 370/210 |
| 2003/0231723 A1* | 12/2003 | Hansen | 375/343 |
| 2004/0082356 A1 | 4/2004 | Walton et al. | |
| 2004/0203472 A1 | 10/2004 | Chien | |
| 2004/0233838 A1 | 11/2004 | Sudo et al. | |
| 2006/0039506 A1 | 2/2006 | Dalessandro | |
| 2006/0131414 A1* | 6/2006 | Nakaya et al. | 235/451 |
| 2007/0036205 A1* | 2/2007 | Nakamori et al. | 375/148 |
| 2007/0160156 A1* | 7/2007 | Melzer et al. | 375/260 |
| 2008/0080635 A1* | 4/2008 | Hugl et al. | 375/267 |

FOREIGN PATENT DOCUMENTS

| | | |
|---|---|---|
| EP | 1494381 A1 | 1/2005 |
| EP | 1573995 | 9/2005 |
| EP | 1580951 A2 | 9/2005 |
| GB | 2249672 | 5/1992 |
| JP | 10070504 A | 3/1998 |
| JP | 10233711 A | 9/1998 |
| JP | 2003304215 A | 10/2003 |
| JP | 2006509438 A | 3/2006 |
| JP | 2006242719 | 9/2006 |
| JP | 2007010497 | 1/2007 |
| RU | 2281609 C2 | 8/2006 |
| WO | WO9853560 A1 | 11/1998 |
| WO | 0135546 A1 | 5/2001 |
| WO | WO0209297 A2 | 1/2002 |
| WO | WO02075950 | 9/2002 |
| WO | 2004054194 A1 | 6/2004 |
| WO | WO2005083402 | 9/2005 |
| WO | WO2006094037 A2 | 9/2006 |
| WO | WO2006095046 A1 | 9/2006 |
| WO | 2006130865 A2 | 12/2006 |
| WO | 2006138555 A2 | 12/2006 |

OTHER PUBLICATIONS

Taiwan Search Report—TW097100464—TIPO—Aug. 4, 2012.
Forenza A., et al., "Adaptive MIMO transmission scheme: Exploiting the spatial selectivity of wireless channels", 2005 IEEE 61st Vehicular Technology Conference, VTC 2005—Spring, vol. 5, pp. 3188-3192.

* cited by examiner

HIGH PERFORMANCE STATION

CROSS-REFERENCE

This application claims the benefit of U.S. Provisional Application Ser. No. 60/883,733, filed Jan. 5, 2007, and entitled "HIGH PERFORMANCE RECEIVER," the entirety of which is incorporated herein by reference.

BACKGROUND

1. Field

The subject disclosure relates generally to wireless communications, and more specifically to signal processing techniques for devices operating in a wireless communication system.

2. Background

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Wireless communication systems are growing in popularity, and as a result higher demands are being made on the performance of such systems. For example, there is currently a significant demand for wireless devices that can receive high data rates from large distances and in the presence of increased spectrum interference and noise. Generally, as the maximum data rate in a wireless communication system increases, radio links used for communication in such a system become increasingly vulnerable to impairments such as in-phase and quadrature (I/Q) imbalance, channel estimation errors, and interference. As a result, there is a need in the art for techniques that improve the performance of wireless devices in the presence of such impairments.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for processing data at a wireless station is described herein. The method can comprise obtaining samples related to a radio link utilized by a wireless station for communication; identifying one or more impairments from the obtained samples; computing one or more parameters based at least in part on the obtained samples and the identified impairments, the parameters comprising one or more items selected from a list, the list including an in-phase and quadrature (I/Q) imbalance correction factor, an interference cancellation coefficient, a channel estimate truncation point, a constellation signal-to-noise ratio (SNR) metric, and a multiple-input multiple-output (MIMO) channel rank metric; and adjusting the wireless station based on the one or more computed parameters.

Another aspect relates to a wireless communications apparatus that can comprise a memory that stores data relating to a radio link utilized for communication by the wireless communications apparatus and one or more samples relating thereto. The wireless communications apparatus can further include a processor configured to identify adjustments to be performed at the wireless communications apparatus based on the one or more samples; to select one or more parameters for the adjustments from a list, the list comprising an I/Q correction coefficient, an interference cancellation factor, a channel estimate cutoff point, and a channel quality indicator; and to perform the identified adjustments.

Yet another aspect relates to an apparatus that facilitates signal processing in a wireless communication system. The apparatus can comprise means for obtaining data relating to operating characteristics of the apparatus; means for identifying one or more adjustments to be performed at the apparatus based on the obtained data; means for computing parameters selected from a group to be used in connection with the identified adjustments, the group comprising I/Q correction factors, interference cancellation coefficients, channel estimate cutoff points, constellation SNR metrics, and MIMO rank metrics; and means for performing the identified adjustments at the station based on the computed parameters.

An additional aspect relates to a computer-readable medium, which can comprise code for causing a computer to acquire information relating to a radio link used for communication, the information indicating one or more impairments; code for causing a computer to determine a set of parameters to be computed based on the impairments, the set of parameters selected from a list, the list comprising I/Q calibration coefficients, interference cancellation weights, channel truncation values, and channel quality indicators; and code for causing a computer to compute the set of parameters based on the acquired information to enable adjustment for the impairments based on the set of parameters.

Still another aspect relates to an integrated circuit that can execute computer-executable instructions. The instructions can comprise identifying one or more adjustments to be made at a wireless station; selecting one or more adjustment parameters from a list for the adjustments, the list comprising an I/Q correction coefficient, an interference cancellation factor, a channel estimate truncation point, a constellation SNR, and a MIMO rank metric; computing the selected adjustment parameters; and performing the identified adjustments based on the computed adjustment parameters.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter may be employed. Further, the disclosed aspects are intended to include all such aspects and their equivalents.

DETAILED DESCRIPTION

Figure 1:
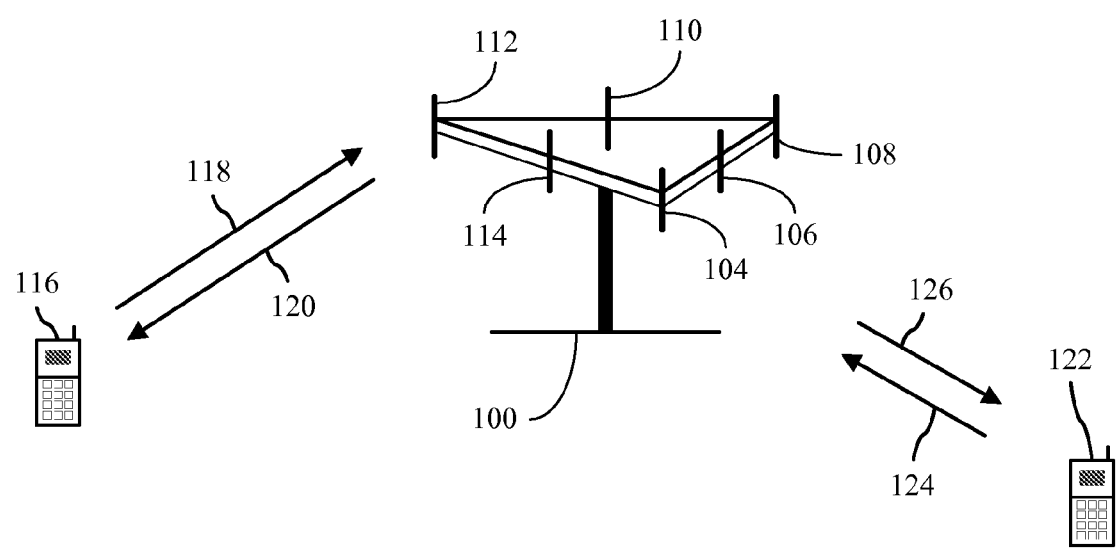
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable terminology. In addition, an access terminal, e.g., an access terminal 116 or 122, can be a fixed or mobile station for communicating with access points and can be referred to as a mobile terminal, user equipment (UE), a wireless communication device, a terminal, a wireless terminal, and/or other appropriate terminology.

Figure 2:
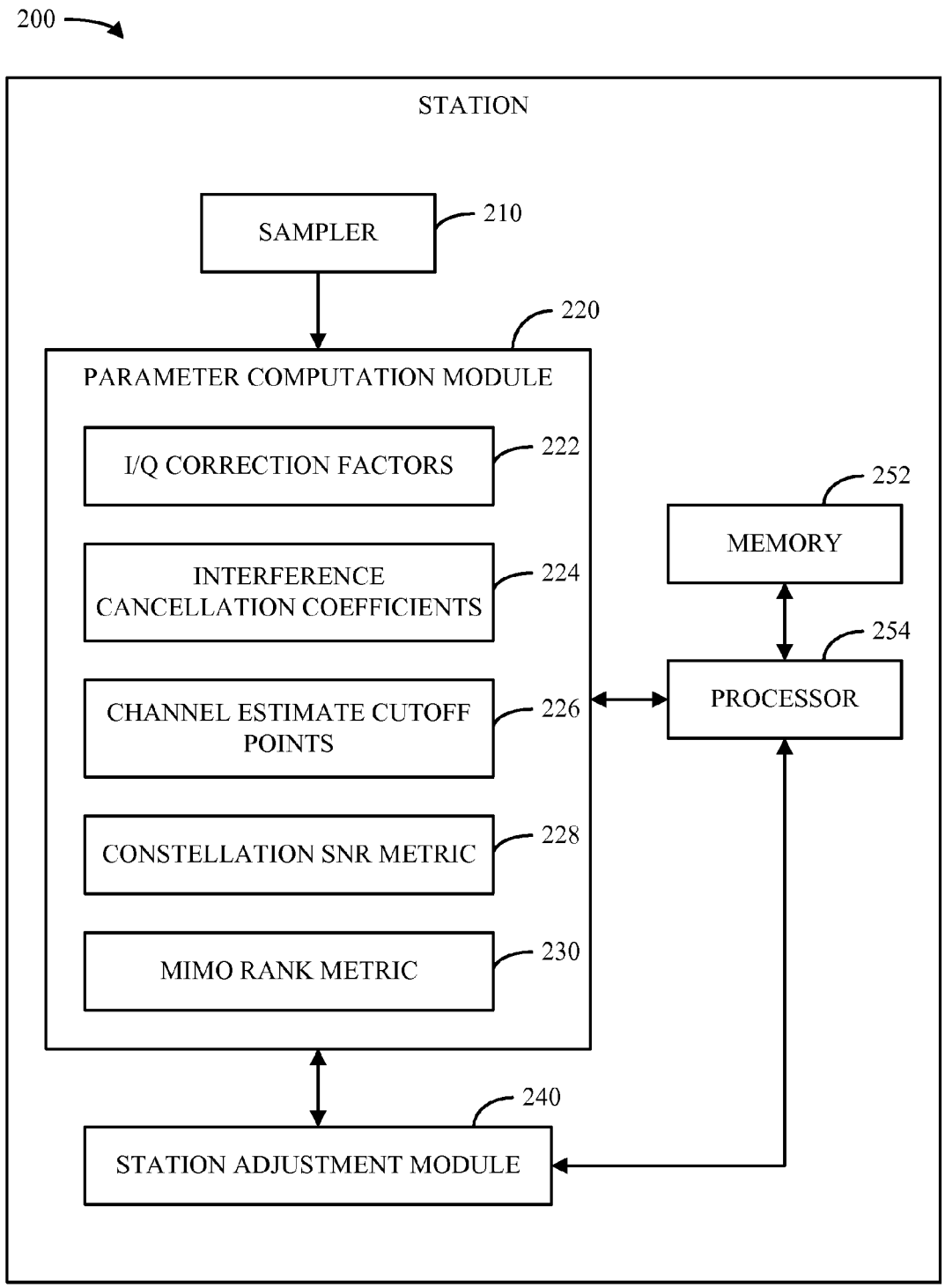
FIG. 2 is a block diagram of an example station that can operate in a wireless communication system in accordance with various aspects.

FIG. 2 is a block diagram of an example station 200 that can operate in a wireless communication system in accordance with various aspects. Station 200 can be, for example, a base station (e.g., access point 100), a wireless station (e.g., access terminal 116 and/or 122), and/or any other suitable device that can operate in a wireless communication system. In one example, station 200 can communicate using resources generated in the form of channels via one or more techniques such as Frequency Division Multiplexing (FDM), Orthogonal Frequency Division Multiplexing (OFDM), Time Division Multiplexing (TDM), Code Division Multiplexing (CDM), and the like. Further, station 200 can employ one or more antennas to utilize communication channels according to a single-input single-output (SISO), multiple-input single-output (MISO), multiple-input multiple-output (MIMO), and/or another suitable communication scheme.

In accordance with one aspect, a communication link or radio link used by station 200 for communication can be subject to impairments of station 200 and/or the link itself, which can adversely affect the performance of station 200. For example, at a station that utilizes an in-phase and quadrature (I/Q) modulator and/or demodulator, imbalance between the I and Q components of the I/Q modulator and/or demodulator can result in station 200 interpreting a signal differently from what was intended. In turn, this can cause transmitter and/or receiver constellation points to be dispersed, leading to errors in communication.

Additionally, in the event that a station 200 is attempting to receive a signal, other signals can interfere with a signal that is received. This interference can be caused by, for example, computers and/or other electronic devices. Because these electronic devices can be used in close proximity to wireless devices such as station 200, such interference can adversely impact the performance of station 200.

As another example, station 200 can determine possible values for effects on a signal that are introduced by a communication channel through channel estimation. As the accuracy of a channel estimate increases, the effects of the estimated channel can be better corrected. On the other hand, however, errors in a channel estimate can adversely impact the ability of a wireless station to correct for the effects of a communication channel.

Further, at a station that utilizes multiple modes for different data rates, a data rate can be selected based on the error probability over a link for the data rate. In such an example, choosing a suitable data rate that will have an acceptable error probability on a given wireless link can be done by considering the signal-to-noise ratio (SNR) and the MIMO rank for the link. Based on the SNR and rank metrics, a station can predict a maximum possible data rate and number of spatial streams to achieve a desired maximum packet error probability. Thus, inaccuracy in the SNR and/or MIMO rank metric utilized by the station will adversely impact the rate and/or error performance of the station.

Thus, to minimize the impact of these and/or other impairments on the performance of station 200, station 200 can utilize one or more mechanisms that facilitate adjustment of station 200 to account for such impairments. For example, as illustrated by FIG. 2, station 200 can utilize a sampler 210 to obtain data relating to station 200 and/or a wireless link used for communication by station 200. Data that can be obtained by sampler 210 includes samples of signals produced by an I/Q modulator/demodulator at station 200, received signals at one or more antennas associated with station 200, estimated channel information, received symbols in relation to constellation points, and/or other appropriate information.

In accordance with one aspect, data obtained by sampler 210 can then be provided to a parameter computation module 220. In one example, parameter computation module 220 can identify factors that can affect the performance of station 200 from the data provided by sampler 210. Based on these data, parameter computation module 220 can compute one or more parameters to minimize the impact of the identified factors on the performance of station 200. Parameters that can be computed by parameter computation module 220 can include, for example, I/Q correction factors 222, interference cancellation coefficients 224, channel estimate cutoff points 226, constellation SNR metrics 228, MIMO rank metrics 230, and/or other suitable parameters. Techniques that can be used for computation of these parameters are provided in more detail infra.

As parameter computation module 220 computes various parameters, the parameters can be provided to a station adjustment module 240 and/or another suitable component of station 200. Station adjustment module 240 can then adjust station 200 based on the computed parameters. In one example, the adjustments performed by station adjustment module 240 can correct for impairments to the performance of station 200 that are identified by parameter computation module 220. Examples of corrections that can be applied by station adjustment module 240 based on parameters computed by parameter computation module 220 are provided infra. In accordance with another aspect, parameter computation module 220 and/or station adjustment module 240 can additionally interact with a processor 254, which in turn can utilize a memory 252.

In accordance with various aspects, techniques that can be utilized by sampler 210, parameter computation module 220, and station adjustment module 240 at station 200 are described in further detail in the following description. It should be appreciated, however, that the following techniques are provided by way of example and not limitation. Thus, as one of skill in the art can appreciate, additional and/or alternative techniques can also be performed by station 200. Further, the various techniques described herein can alternatively be performed in a different manner from the provided description.

In accordance with one aspect, station 200 can perform I/Q imbalance calibration and correction by computing and applying I/Q correction factors 222 using short finite impulse response (FIR) filters as follows. A signal x(n) can initially be transmitted to station 200, which can comprise subcarrier signals of the form $\cos(\omega_k t)+j \sin(\omega_k t)$. However, in the presence of an I/Q phase imbalance (denoted herein as $\phi_k$), a signal actually received at station 200 at a subcarrier k can be expressed as follows:

$$x(n)=\cos(\omega_k t-\phi_k)+j\sin(\omega_k t+k). \quad (+1)$$

Using trigonometric identities, Equation (1) can be rewritten in the form shown in Equation (2):

$$\begin{aligned}x(n) &= \cos(\varphi_k)\cos(\omega_k t) + \sin(\varphi_k)\sin(\omega_k t) + \\ &\quad j[\cos(\varphi_k)\sin(\omega_k t) + \sin(\varphi_k)\cos(\omega_k t)] \\ &= \cos(\varphi_k)[\cos(\omega_k t) + j\sin(\omega_k t)] + \\ &\quad \sin(\varphi_k)[\sin(\omega_k t) + j\cos(\omega_k t)] \\ &= \cos(\varphi_k)[\cos(\omega_k t) + j\sin(\omega_k t)] + \\ &\quad \sin(\varphi_k)[\cos(\omega_k t - \pi/2) - j\sin(\omega_k t - \pi/2)]\end{aligned} \quad (2)$$

The first term of the expression provided by Equation (2) corresponds to a desired subcarrier at frequency k. As illustrated by Equation (2), the amplitude of this term is decreased by $\cos(\phi_k)$. The second term of the expression provided by Equation (2), on the other hand, corresponds to a subcarrier at a mirror frequency −k and has an amplitude of $\sin(\phi_k)$.

In the frequency domain, a similar expression to that provided by Equations (1) and (2) is available. For example, X(k) can be defined as the fast Fourier transform (FFT) output for a subcarrier k. Based on X(k) and a known I/Q phase imbalance $\phi_k$, a phase imbalance corrected signal, herein denoted as $X_c(k)$, can be derived as follows:

$$X_c(k)=X(k)\cos(\phi_k)+jX^*(-k)\sin(\phi_k). \quad (3)$$

From this expression, it can be verified for the example of one subcarrier provided above that the corrections noted with regard to Equations (1) and (2) can be utilized to restore an originally transmitted signal. For example, for a given signal x(n), uncorrected FFT outputs can be expressed as follows for subcarriers k and −k:

$$X(k)=\cos(\phi k)$$

$$X(-k)=\sin(\phi_k)e^{-j\pi/2}=-j\sin(\phi_k). \quad (4)$$

From these uncorrected FFT outputs, a correction can be applied to obtain corrected FFT outputs as follows:

$$X_c(k)=\cos(\phi_k)\cos(\phi_k)+j\sin(\phi_k)e^{-j\pi/2}\sin(\phi_k)=\cos^2(\phi_k)+\sin^2(\phi_k)=1$$

$$X_c(-k)=\sin(\phi_k)e^{-j\pi/2}\cos(\phi_k)+j\cos(\phi_k)\sin(\phi_k)=0. \quad (5)$$

Accordingly, it can be appreciated that I/Q correction can be used by station 200 to eliminate cross-talk between subcarriers k and −k.

In one example, station 200 can also apply phase imbalance correction in the time domain by performing an inverse Fourier transform for Equation (3) as follows:

$$x_c(n)=x(n)F^{-1}(\cos(\phi_k))+jx^*(n)F^{-1}(\sin(\phi_k)). \quad (6)$$

As used in Equation (6), x(n) is a series of time domain samples, such as samples collected by sampler 210, and $F^{-1}$ represents the inverse Fourier transform. In accordance with one aspect, imbalance correction can be done in the time domain by station 200 by approximating $F^{-1}(\sin(\phi_k))$ as a small FIR. By doing so, the overall complexity of the imbalance can be reduced as the small FIR can require fewer multiplications per sample as compared to the above-described frequency domain method.

In one example, a three-tap FIR approximation can be used by station 200. By way of non-limiting example, a three-tap FIR approximation utilized by station 200 can utilize I/Q correction factors 222 denoted as $c_{pm}$ and $c_{ps}$, which can be determined by parameter computation module 220 and/or another suitable module associated with station 200. The three-tap FIR approximation can further be defined as shown in the following equation:

$$F^{-1}(\cos(\phi_k))\cong\{0,1,0\}$$

$$F^{-1}(\sin(\phi_k))\cong\{-jc_{ps},c_{pm},jc_{ps}\}. \quad (7)$$

In accordance with one aspect, by utilizing such a three-tap FIR, a phase imbalance that varies approximately linearly across frequency can be efficiently corrected at station 200. A linear phase imbalance variation can be caused, for example, by small differences in the cutoff frequencies of filters in the I and Q rail of an I/Q modulator and/or demodulator associated with station 200. These differences can give rise to a group delay difference between the I and Q components, which can in turn cause a phase imbalance that increases approximately linearly with frequency. The mean phase imbalance can be caused, for example, by imperfections in the 90 degree difference between the local oscillator signals that are used to downconvert a signal having an intermediate frequency (IF) to baseband I/Q and/or or to upconvert I/Q to IF. It should be appreciated that I/Q phase imbalance can also be caused by additional and/or alternative factors and that the techniques described herein can additionally correct imbalance attributable to these causes as well.

In the FIR coefficients provided by Equation (7), cpm represents the mean phase imbalance across all subcarriers, while cps represents the slope of the phase correction across frequency. Thus, at a given frequency f, the amount of phase correction applied can be represented by $2c_{ps}\sin(2\pi f/f_s)+c_{pm}$, where fs is the sampling rate. Thus, to approximate a linear phase imbalance correction, a correction circuit associated with station 200 can be configured to run at an oversampled rate. In one example, I/Q imbalance correction can be applied at an analog to digital converter (ADC) output of a receiver and/or at a FIR output of a transmitter.

Figure 3A:
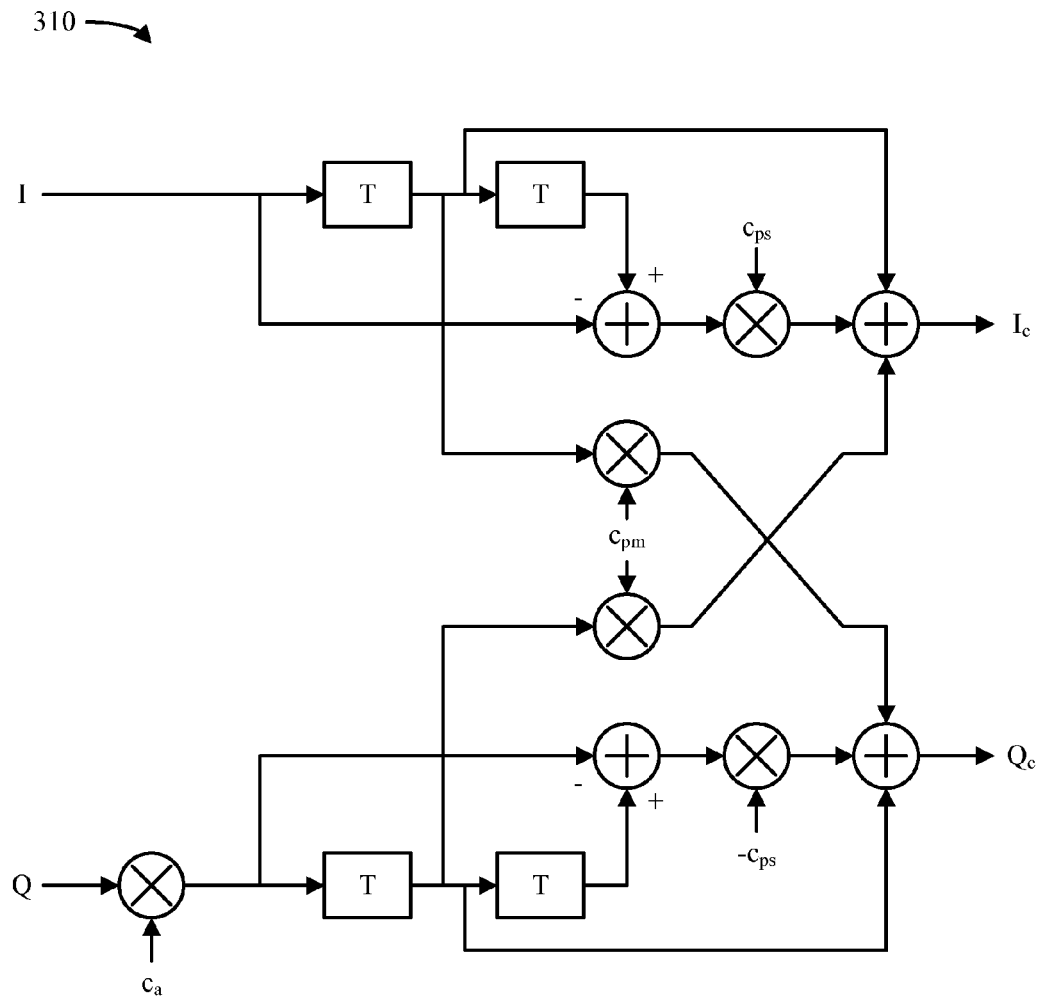
FIGS. 3A-3B are schematic diagrams of example I/Q phase and amplitude corrections in accordance with various aspects.
Figure 3B:
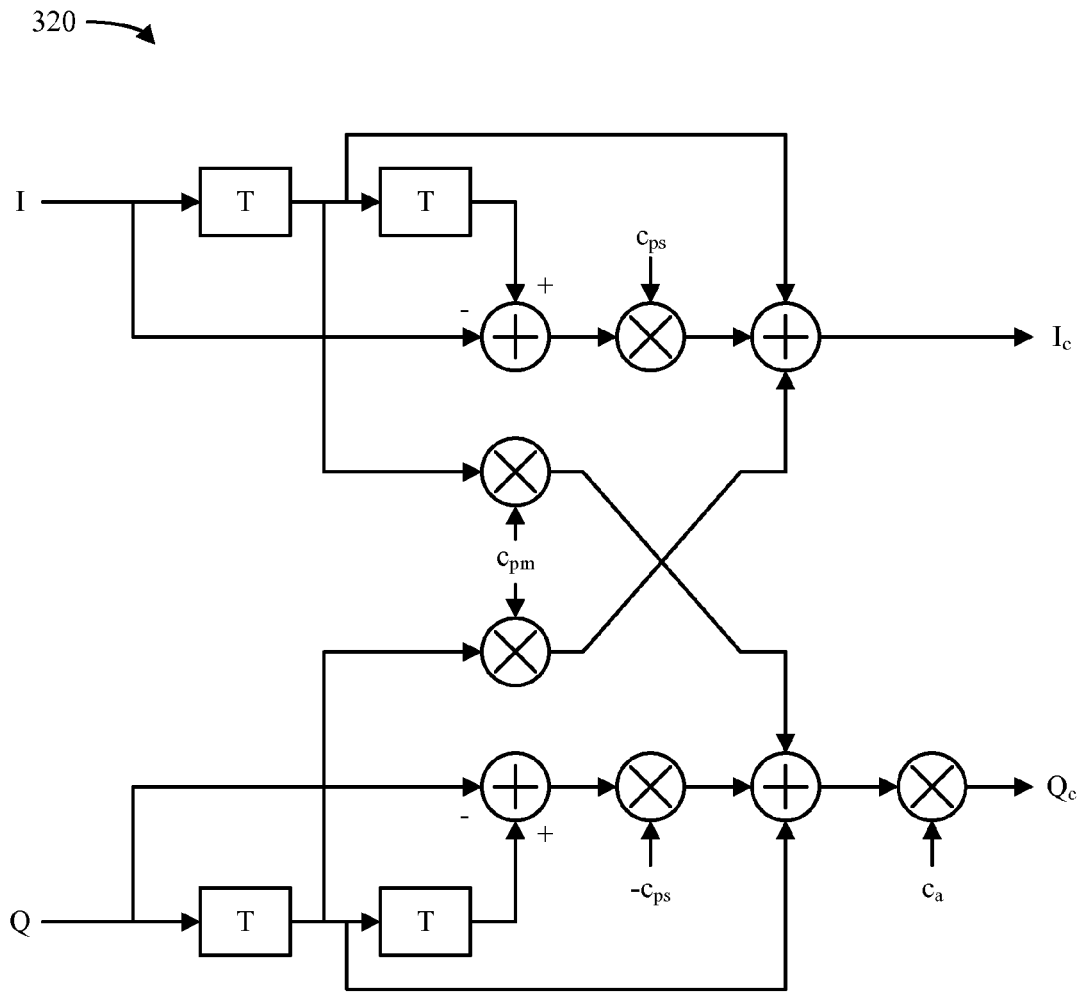

FIGS. 3A-3B are diagrams 310 and 320 that illustrate example correction schemes that can be utilized for I/Q phase and amplitude imbalance correction. It should be appreciated that diagrams 310 and/or 320 can be implemented using circuits, logical modules, and/or any other appropriate means. Further, the correction schemes illustrated by diagrams 310 and 320 can be associated with station adjustment module 240 and/or any appropriate module(s) associated with station 200. In accordance with one aspect, diagram 310 illustrates I/Q phase and amplitude imbalance correction for a receiver, while diagram 320 illustrates I/Q phase and amplitude imbalance correction for a transmitter. As can be observed from diagrams 310 and 320, I/Q imbalance correction can be performed similarly for a receiver and a transmitter with a difference in location for amplitude imbalance correction. For example, as diagram 310 illustrates, amplitude imbalance correction for a receiver can be performed before phase imbalance correction at an ADC output and/or another suitable initial processing stage. In contrast, as diagram 320 illustrates, amplitude imbalance correction for a transmitter can be performed as a final processing step before samples are provided to a digital to analog converter (DAC) and/or another suitable signal processing phase.

In one example, station 200 can estimate receiver I/Q phase and amplitude imbalance as follows. First, a tone can be generated at a subcarrier k and a predetermined number of samples (e.g., 64) of a resulting received signal x can be obtained and stored by sampler 210 for use as a test signal for estimating I/Q imbalance. In one example, multiple tones can be generated and utilized simultaneously provided that there are no tones having an equal distance from a zero subcarrier (e.g., no tones at both subcarriers k and −k). Thus, multiple tones generated at, for example, the subcarrier set of {−8, −4, +2, +6} could be utilized.

Next, an amplitude imbalance correction factor $c_a$ can be estimated by parameter computation module 220 as the root mean square (RMS) value of the real part of x divided by the RMS value of the quadrature part of x as shown in Equation (8):

$$c_a = \frac{\sqrt{\sum_n |\text{Re}\{x(n)\}|^2}}{\sqrt{\sum_n |\text{Im}\{x(n)\}|^2}}. \tag{8}$$

Based on the amplitude imbalance correction factor $c_a$, station adjustment module 240 can then perform amplitude imbalance correction for x.

Upon performing amplitude imbalance correction, an FFT of x(n) can be performed to obtain a frequency domain signal $X_k$. From this signal, parameter computation module 220 can estimate phase imbalance as shown in Equation (9):

$$\varphi(k) = \tan^{-1}\left(\frac{-\text{Im}\{X_{-k} X_k\}}{X_k X_k^*}\right). \tag{9}$$

From the phase imbalance provided by Equation (9), parameter computation module 220 can determine phase imbalance correction coefficients $c_{pm}$ and $c_{ps}$, where $c_{pm}$ is the mean of the phase imbalance ϕ(k) averaged over all measured tones and $c_{ps}$ is selected to provide a suitable match between the phase correction $2c_{ps} \sin(2\pi f/f_s)$ and the actual measured phase variation across frequency around the mean value $c_{pm}$. In one example, these parameters can be estimated as illustrated in Equations (10) and (11), where $N_t$ represents the number of tones used for calibration:

$$c_{pm} = \frac{1}{N_t} \sum_k \varphi(k), \tag{10}$$

$$c_{ps} = 0.77 \frac{32}{N_t} \sum_{k=0}^{N_t} \frac{\varphi(k_n) - \varphi(k_p)}{k_p - k_n}. \tag{11}$$

As illustrated by Equation (11), the calculation of $c_{ps}$ can be done by averaging phase differences for pairs of positive tones (denoted in Equation (11) as $k_p$) and negative tones (denoted in Equation (11) as $k_n$). For example, for a set of tones located at {−30, −20, +18, +28}, averaging can be conducted over [ϕ(−30)−ϕ(18)]/48 and [ϕ(−20)−ϕ(28)]/48. Further, a correction factor of 0.77 can be utilized to match the slope of a sinusoidal imbalance correction. In one example, a short FIR imbalance correction can represent a sinusoidal I/Q phase imbalance across frequency while actual phase imbalance is assumed to be linearly varying across frequency. Thus, the estimated linear phase slope can be multiplied by a correction factor as shown in Equation (11) such that it matches the slope of the sinusoidal imbalance correction. In accordance with one aspect, the correction factor utilized can depend on the amount of oversampling used in an associated short FIR correction circuit. It should be appreciated that as the oversampling ratio approaches infinity, the correction factor can approach 2/π, which is approximately equal to 0.637.

In another example, station 200 can additionally and/or alternatively estimate transmitter I/Q phase and amplitude imbalance as follows. Transmitter I/Q calibration can begin by first performing receiver I/Q calibration, thereby permitting an assumption that residual receiver I/Q imbalance is negligible during the transmitter I/Q calibration. Next, a single tone can be transmitted using only the I component of the transmitter, such that Q=0, and a first resulting signal $x_i(n)$ can be measured and stored by sampler 210. Next, a single tone can be transmitted using only the Q component of the transmitter, such that I=0, and a second resulting signal $x_q(n)$ can be measured and stored by sampler 210. Based on these resulting signals, a transmitter amplitude correction factor $c_a$ can then be estimated by parameter computation module 220 as the RMS value of $x_i$ divided by the RMS value of $x_q$ as follows:

$$c_a = \frac{\sqrt{\sum_n |x_i(n)|^2}}{\sqrt{\sum_n |x_q(n)|^2}}. \tag{12}$$

The transmitter imbalance correction factor $c_a$ can then be set by station adjustment module 240 upon its estimation such that amplitude imbalance does not impact phase imbalance calibration.

After performing amplitude imbalance calibration, phase imbalance calibration can be performed by first generating a tone at a subcarrier k, from which a predetermined number of samples (e.g., 64) of a received signal x can be stored by sampler 210. As described above for receiver calibration, multiple tones can be generated and utilized at the same time provided that there are no pairs of tones having an equal distance from a zero subcarrier. An FFT of x(n) can then be performed to obtain a frequency domain signal $X_k$. Parameter computation module 220 can then estimate phase imbalance from $X_k$ as follows:

$$\varphi(k) = \tan^{-1}\left(\frac{-\text{Im}\{X_{-k} X_k\}}{X_k X_k^*}\right). \tag{13}$$

From this phase imbalance, parameter computation module 220 can determine phase imbalance correction coefficients $c_{pm}$ and $c_{ps}$, where $c_{pm}$ is the mean of the phase imbalance ϕ(k) averaged over all measured tones and $c_{ps}$ is selected to provide a close match between the phase correction $2c_{ps} \sin(2\pi f/f_s)$ and the actual measured phase variation across frequency around the mean value $c_{pm}$. Similar to the procedure for receiver I/Q calibration provided above, these parameters can be estimated as follows, where $N_t$ represents the number of tones used for calibration:

$$c_{pm} = \frac{1}{N_t} \sum_k \varphi(k), \quad (14)$$

$$c_{ps} = 0.68 \frac{64}{N_t} \sum_{k=0}^{N_t} \frac{\varphi(k_n) - \varphi(k_p)}{k_p - k_n}. \quad (15)$$

In one example, the calculation of $c_{ps}$ illustrated by Equation (15) can be performed by averaging phase differences for pairs of positive tones $k_p$ and negative tones $k_n$ in a similar manner to Equation (11). In another example, the constant applied in Equation (15) for transmitter I/Q calibration (e.g., 0.68*64) can be different for that used for receiver I/Q calibration as provided by Equation (11). Differences between the constants applied in Equations (11) and (15) can be attributed to, for example, differences in oversampling rates used for a receiver and transmitter. For example, the constant provided in Equation (11) can be used in connection with 2× oversampling while the constant provided in Equation (15) can be used in connection with 4× oversampling. Similarly, corresponding correction factors can be utilized for other sampling rates. Further, it can be appreciated that the constant applied in Equation (15) results in a correction slope that is twice as low as the correction slope provided by Equation (11). As a result, sine wave correction based on Equation (15) can result in a close linear approximation in a frequency region of interest.

In sum, the above description provides techniques that can be employed by a station 200 for I/Q imbalance calibration and correction of a transmitter and/or a receiver. It should be appreciated, however, that the above description is provided by example and not limitation. For example, it should be appreciated that transmitter imbalance calibration is not required to improve receiver imbalance calibration performance. Further, some steps of the above techniques can be omitted and/or performed in a different order than described.

In accordance with another aspect, station 200 can perform interference cancellation by computing and applying interference cancellation coefficients 224 as follows. The following interference cancellation techniques can be utilized, for example, to improve the performance of a wireless local area network (wireless LAN or WLAN) link in the presence of interference caused by nearby computing devices. In one example, such interference can be wideband and time varying. For example, such interference can be in the form of impulsive noise, where regular bursts of impulses with amplitudes of more than 20 dB above the thermal noise level are present. As another example, computer-induced interference can be in the form of chirp interference, where a computer produces chirps that sweep across an entire channel over a period of approximately 10 microseconds. Like impulsive noise, the chirp amplitude can be more than 20 dB above the thermal noise floor. As an additional example, such interference can be additive Gaussian white noise (AWGN)-like broadband noise having a level of several decibels above the thermal noise floor, but which is strongly correlated across receive antennas.

Thus, to maximize performance in an environment with significant amounts of these and/or other types of interference, station 200 can provide interference cancellation by performing one or more of the following functions. First, parameter computation module 220 can estimate cross-correlation values and cancellation coefficients. Next, station adjustment module 240 can be utilized to cancel identified interference on a received signal before it enters an automatic gain control (AGC) system and/or one or more receivers (denoted herein as RXA and/or RXB) at station 200. This can be accomplished by, for example, determining a cancellation signal based on the estimated cross-correlation values and cancellation coefficients and injecting the cancellation signal into the receiver chains prior to the AGC, RXA, and/or RXB blocks. Station adjustment module 240 can then be additionally employed to ensure that signals from respective antennas going into respective packet detectors at station 200 have equal power levels. In accordance with one aspect, this function can be used to improve detection performance in cases where interference cannot be fully cancelled and where large noise or interference differences can be seen between antennas. For example, in packet detectors that do not perform antenna weighting, detection performance can degraded antennas experience significantly different interference levels. Thus, antenna power levels can be equalized prior to packet detection to minimize this performance degradation.

In accordance with one aspect, an interference cancellation technique performed by station 200 can utilize cross-correlation values between receiver chains. In the following description, it is assumed that there are three antenna input signals, denoted as $x_0$, $x_1$, $x_2$. However, as one of skill in the art can appreciate, the described techniques can easily be expanded to a station having more or less antennas.

In one example, samples of signals $x_0$, $x_1$, $x_2$ obtained by, for example, sampler 210, can be utilized by parameter computation module 220 to estimate cross-correlations between the receiver chains as shown in Equation (16):

$$c_{01} = \frac{\sum_{N_t} x_0 x_1^*}{\sqrt{\sum_{N_t} x_0 x_0^* \sum_{N_t} x_1 x_1^*}}$$

$$c_{02} = \frac{\sum_{N_t} x_0 x_2^*}{\sqrt{\sum_{N_t} x_0 x_0^* \sum_{N_t} x_2 x_2^*}}. \quad (16)$$

$$c_{12} = \frac{\sum_{N_t} x_1 x_2^*}{\sqrt{\sum_{N_t} x_1 x_1^* \sum_{N_t} x_2 x_2^*}}$$

As used in Equation (16), $N_t$ represents the number of samples over which a moving average is done and $c_{ij}$ denotes a cross-correlation value between antenna i and antenna j. In one example, such cross-correlation reduces noise averaging gain. For example, adding three signals having the same desired signal but uncorrelated noise can result in the SNR of the added signal increasing by a factor of 3 (e.g., 5 dB). On the other hand, if the nose is substantially similar on all antennas, adding the signals may result in no averaging gain.

When station 200 is in a correlation state, parameter computation module 220 and/or another appropriate module at station 200 can continuously estimate cross-correlation values and keep track of a worst case cross-correlation measured over a preceding $T_{ic}$ seconds. In the event that a packet is detected, all cross-correlation values that occurred less than a time of $T_{di}$ before the packet is detected can then be discarded. Further, if the worst case cross-correlation estimated by parameter computation module 220 exceeds a threshold, cancellation for station 200 can be activated.

In one example, computation of the moving average provided by Equation (16) can be simplified by splitting the computation between an "integrate-and-dump" operation over a fixed minimum number of samples and a programmable moving average module that can operate at a lower rate. By way of specific, non-limiting example, a minimum of 64 samples can be required for estimation of correlation values. Based on this minimum interval, interference cancellation estimates can be performed by parameter computation module as shown in the following equations. For example, estimation of correlation values can be performed as follows:

$$c_{01} = \frac{\sum_{N_{ic}} \sum_{32} x_0 x_1^*}{\sqrt{\sum_{N_{ic}} \sum_{32} x_0 x_0^* \sum_{N_{ic}} \sum_{32} x_1 x_1^*}} \quad (17)$$

$$c_{02} = \frac{\sum_{N_{ic}} \sum_{32} x_0 x_2^*}{\sqrt{\sum_{N_{ic}} \sum_{32} x_0 x_0^* \sum_{N_{ic}} \sum_{32} x_2 x_2^*}}.$$

$$c_{12} = \frac{\sum_{N_{ic}} \sum_{32} x_1 x_2^*}{\sqrt{\sum_{N_{ic}} \sum_{32} x_1 x_1^* \sum_{N_{ic}} \sum_{32} x_2 x_2^*}}$$

Further, estimation of cancellation coefficients can be performed as shown in Equation (18):

$$w_{01} = w_0 \frac{\sum_{N_{ic}} \sum_{64} x_0 x_1^*}{\sum_{N_{ic}} \sum_{64} x_1 x_1^*} \quad (18)$$

$$w_{02} = (1 - w_0) \frac{\sum_{N_{ic}} \sum_{64} x_0 x_2^*}{\sum_{N_{ic}} \sum_{64} x_2 x_2^*}$$

$$w_{10} = w_1 \frac{\sum_{N_{ic}} \sum_{64} x_1 x_0^*}{\sum_{N_{ic}} \sum_{64} x_0 x_0^*}$$

$$w_{12} = (1 - w_1) \frac{\sum_{N_{ic}} \sum_{64} x_1 x_2^*}{\sum_{N_{ic}} \sum_{64} x_2 x_2^*}$$

$$w_{20} = w_2 \frac{\sum_{N_{ic}} \sum_{64} x_2 x_0^*}{\sum_{N_{ic}} \sum_{64} x_0 x_0^*}$$

$$w_{21} = (1 - w_2) \frac{\sum_{N_{ic}} \sum_{64} x_2 x_1^*}{\sum_{N_{ic}} \sum_{64} x_1 x_1^*}.$$

In one example, summations over the set of samples performed in Equations (17) and (18) can be implemented using an "integrate-and-dump" summator, which can operate on, for example, 20 MHz or 40 MHz input samples. In addition, a moving sum can be performed over the last $N_{ic}$ outputs of the sum for the set of samples. Thus, in the specific example of summations over 64 samples, the moving sum and correlation coefficients can be updated once every 64 samples. In another example, the number $N_{ic}$ can be programmable with a range of 1 to 8. Further, the coefficients $w_0$, $w_1$, $w_2$ can be programmable with a range of 0 to 1 and/or a default value of 0.5. It should be appreciated, however, that other numbers of samples and/or ranges for $N_{ic}$ and/or $w_0$, $w_1$, $w_2$ could alternatively be utilized.

The complex cancellation coefficients $w_{01}$ to $w_{21}$ can be fixed or changeable. In one example, the cancellation coefficients can additionally be set in software used to implement calculations. This can be done, for example, for purposes of debugging and/or to implement various cancellation techniques that utilize software code for computing cancellation coefficients based on the observed estimates $c_{01}$, $c_{02}$, $c_{12}$, $w_{01}$, $w_{02}$, $w_{12}$, $w_{13}$, $w_{20}$, $w_{21}$, etc.

The following description provides a specific, non-limiting example of an implementation that can be utilized by station 200 for interference cancellation as described above. Station 200 can first keep track of the worst case cross-correlation values measured over the past $T_{ic}$ seconds. If a packet is detected, cross-correlation values that occurred less than $T_{di}$ seconds before the packet was detected can be discarded. Further, if the worst case cross-correlation found by station 200 exceeds a threshold, cancellation can be activated. To select interference cancellation coefficients 224 for the cancellation, parameter computation module 220 can utilize an algorithm as detailed below. First, upon startup of station 200 and/or a channel change at station 200, variables utilized for the algorithm can be initialized as shown below in Table 1:

TABLE 1

Variable initialization for an example Interference Cancellation algorithm.

| Variable Name | Description |
|---|---|
| n = 0 | Sample counter |
| k = 0 | Counter for number of correlation |
| buf[k] = 0, k = 0, 1, . . . , 31 | Buffer containing the previous 32 maximum correlation values as well as corresponding values for $c_{01}$, $c_{02}$, $c_{12}$, $w_{01}$, $w_{02}$, $w_{12}$, $w_{13}$, $w_{20}$, and $w_{21}$, and a received signal strength indication (RSSI) for receiver chain 0 |

Upon initialization, cancellation coefficients can then be selected by employing the procedure detailed as pseudo-code in Table 2 below for each received sample:

TABLE 2

Pseudo-code for an example Interference Cancellation algorithm.

```
1  For every sample do:
2    n = (n + 1)%64
3    If n = 0 do:
4      k = (k + 1)%32
5      if max(|c_01|,|c_02|,|c_12|) > c_max then
6        store new c_max together with its corresponding cancellation
           weights w_01 to w_21 in buf[k]
7      else
8        buf[k] = buf[(k + 31)%32]
9      if AGC-state > 3 (Correlation state) then
10       make buf[i] = buf[(k + 32 − T_di)%32] for last T_di values,
           so for i = k, (k + 31)%32, (k + 30)%32, ...,
           (k + 32 − (T_di − 1))%32
11     if k = 0 then
12       if c_max,k+1 > c_th & RSSI_k+1 < RSSI_th then
```

TABLE 2-continued

Pseudo-code for an example Interference Cancellation algorithm.

| | |
|---|---|
| 13 | store maximum correlation coefficients $c_{01m}$, $c_{12m}$, $c_{02m}$ and update cancellation coefficients using values in buf[(k + 31)%32] |
| 14 | else |
| 15 | bypass cancellation |
| 16 | $c_{max} = 0$ |
| 17 | reset counter to 32 |

By way of specific, non-limiting example, $N_{ic}$ can be set to a duration of 4 seconds, $T_{di}$ can be set to a duration of 8 seconds, $c_{max}$ can be set to a value of 0.7, and $RSSI_{th}$ can be set to a value of −70 dBm. However, it should be appreciated that other values could alternatively be used. Further, while the algorithm described above can utilize sets of 32 or 64 correlations, it should be appreciated that other numbers of correlations cal also be utilized.

Figure 4:
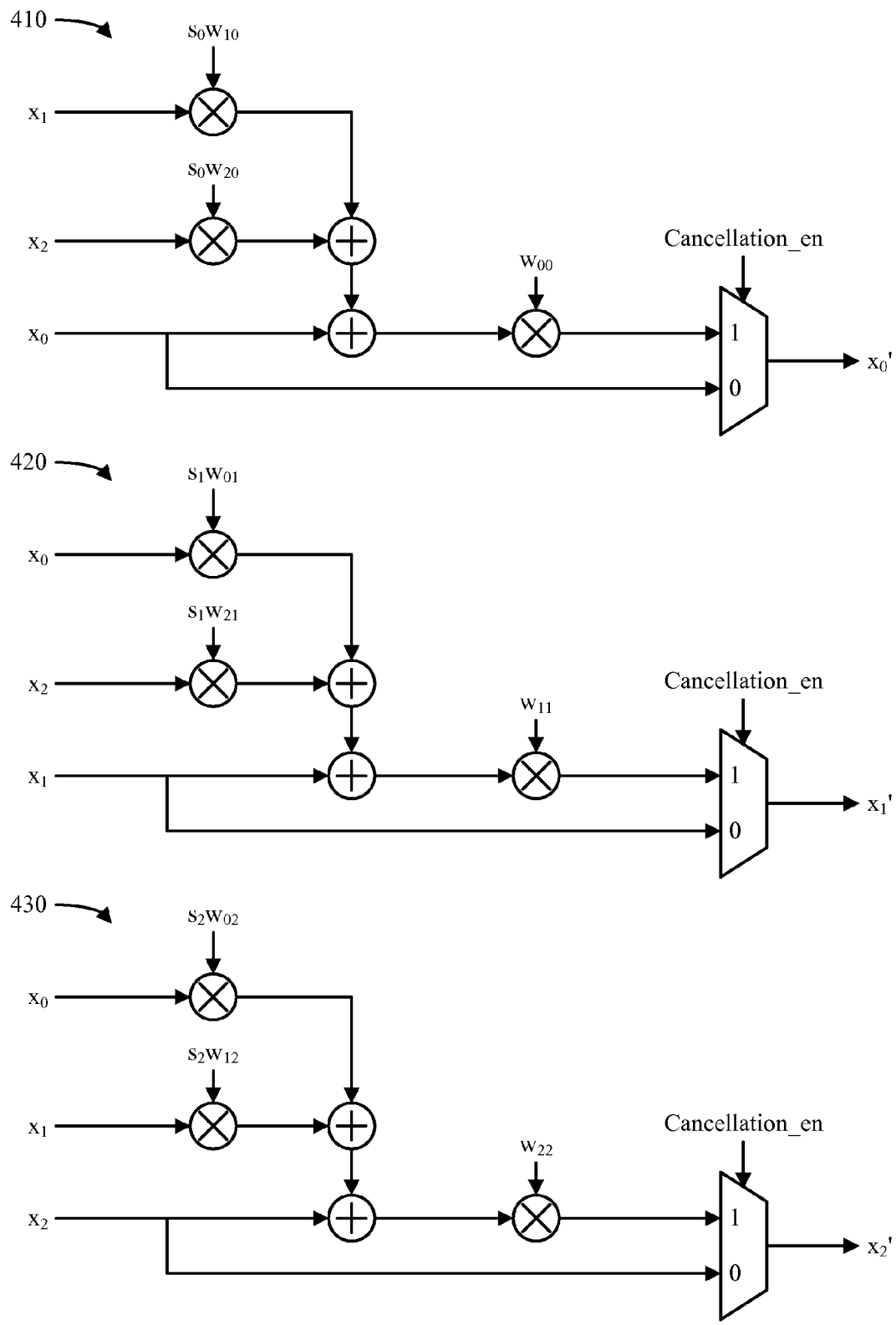
FIG. 4 comprises schematic diagrams of example interference cancellation stages in accordance with various aspects.

Referring to FIG. 4, schematic diagrams 410, 420, and 430 are provided that illustrate example cancellation stages that can be implemented by, for example, station adjustment module 240 for an example station 200 utilizing three antennas. In one example, the cancellation stages illustrated by diagrams 410-430 can be based on interference cancellation coefficients 224 computed by parameter computation module 220.

In accordance with one aspect, the techniques for interference cancellation described above can be combined with techniques for adjusting the determined cancellation weights to maximize the signal-to-interference-plus-noise ratio (SINR) of a received signal. This can be accomplished, for example, by taking the correlation properties of the desired signal into account.

In one such example, a receiving station operating in a wireless LAN network may lack advance knowledge of which node in the network will transmit the next packet. In such an example, weights for the receiving station can be set based on one particular communication link. For example, a client device can set its cancellation weights to maximize the SINR of packets received from an identified source, such as a particular access point. One manner in which this can be performed is as follows. First, software and/or logical modules at the station can analyze SNR metrics for received beacons with interference cancellation activated and deactivated for a period of time. Based on these SNR metrics, the station can decide whether to keep interference cancellation activated or deactivated.

To further improve the interference cancellation performance of station 200, interference estimates can be made during packets in addition to between packets. In one example, this is achieved by allowing the interference cancellation mechanisms at station 200 to execute during packet reception. At the end of a received packet, the correlation estimates $c_{01}$, $c_{02}$, $c_{12}$, $w_{01}$, $w_{02}$, $w_{12}$, $w_{13}$, $w_{20}$, $w_{21}$, etc., can be stored in separate registers to separate desired signal estimates from interference estimates. In one example, these operations can be implemented in hardware, software, or a combination of hardware and software.

Figure 5A:
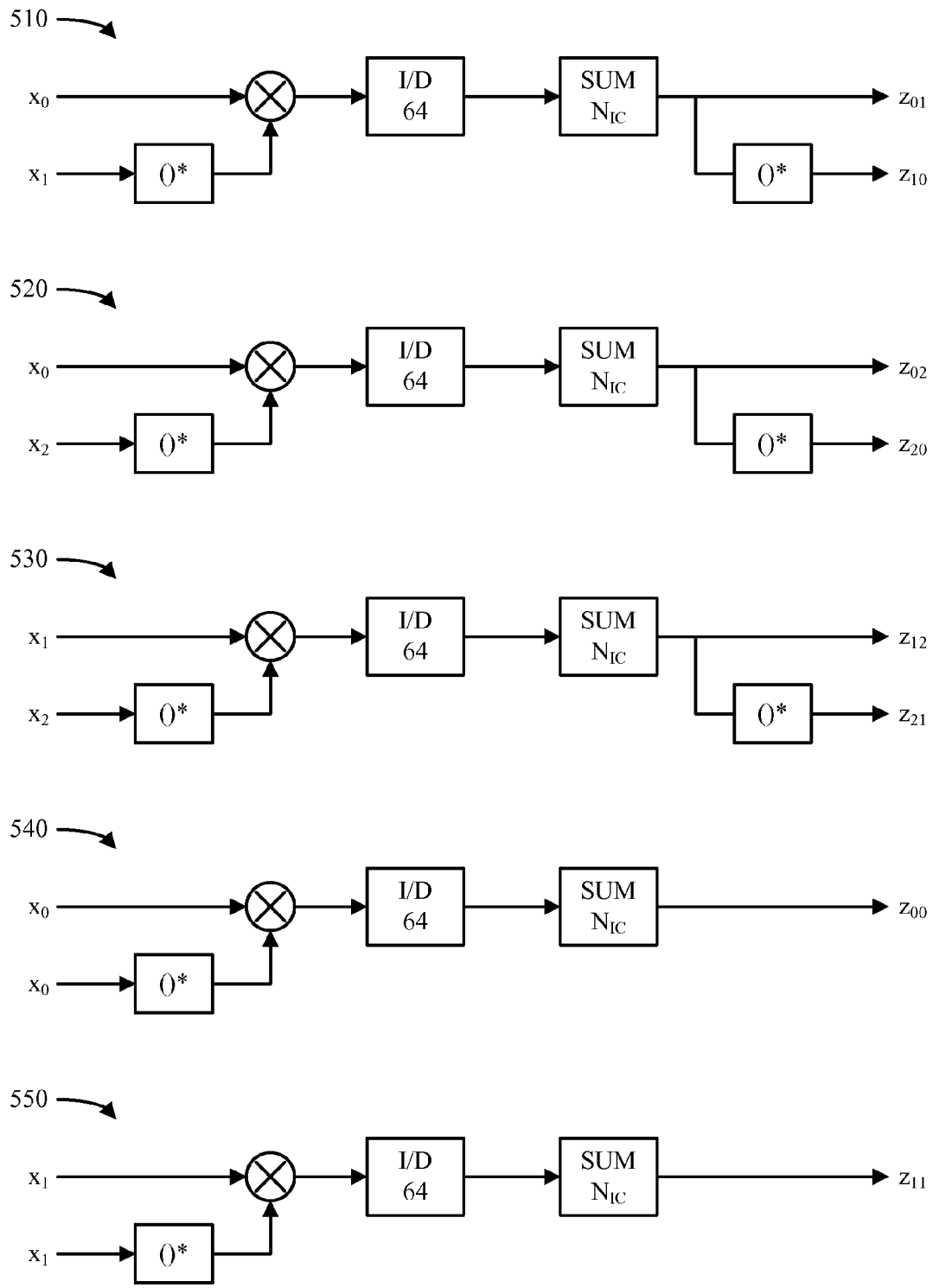
FIGS. 5A-B comprise schematic diagrams of example correlation calculations in accordance with various aspects.
Figure 5B:
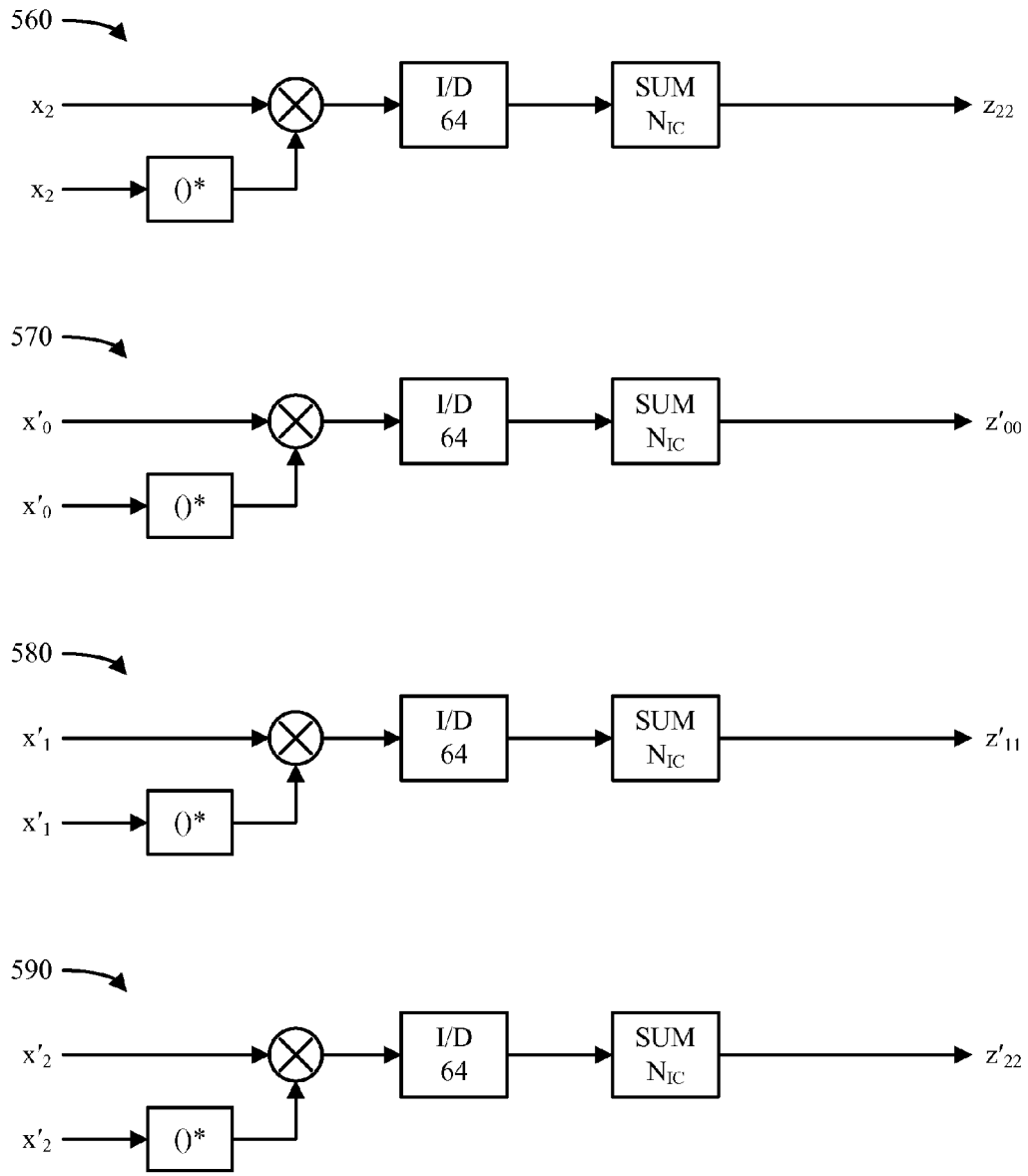

In accordance with another aspect, the parameters $w_{00}$, $w_{11}$, and $w_{22}$ can be used as a digital pre-AGC to ensure that all packet detector inputs have approximately equal noise-plus-interference levels. In one example, the packet detectors may not perform SNR weighting due to the fact that the SNR per chain may not be known in advance. Thus, the performance of station 200 can be degraded if chains do not have approximately equal interference levels. For example, a receiver input with the most noise and the largest power can effectively get the highest weight at the packet detectors when performance could be improved by giving such an input a lower weight. To correct for this effect, the following process can be performed. First, a minimum output power $P_{min}$ can be estimated using the equation $P_{min}=\min(z_{00}', z_{11}', z_{22}')$. FIGS. 5A-5B illustrate diagrams 510-590 of stages that can be utilized by, for example, parameter computation module 220 to compute correlation parameters, such as correlation parameters that are necessary for the estimation of $P_{min}$, in accordance with one aspect. Next, digital AGC correction factors $w_{ii}$ can be calculated using the equation $w_{ii}=\sqrt{P_{min}/z_{ii}'}$ for i=0, 1, 2.

Figure 6:
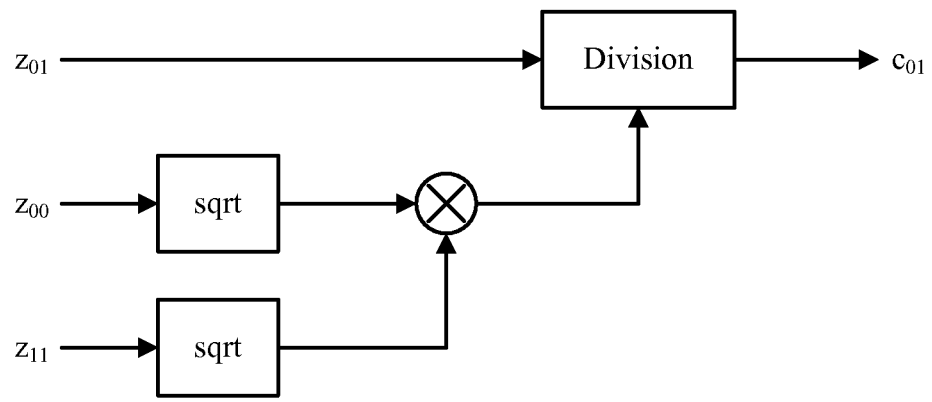
FIG. 6 is a schematic diagram that illustrates an example correlation coefficient calculation in accordance with various aspects.
Figure 7:
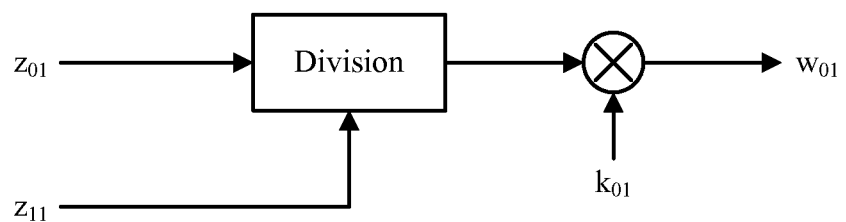
FIG. 7 is a schematic diagram that illustrates an example cancellation coefficient calculation in accordance with various aspects.

Schematic diagram 600 in FIG. 6 and schematic diagram 700 in FIG. 7 illustrate calculations that can be utilized by, for example, parameter computation module 220 to obtain correlation coefficients $c_{ij}$ and cancellation coefficients $w_{ij}$. While only one calculation is illustrated in schematic diagrams 600 and 700, it should be appreciated that similar calculations could be utilized to obtain correlation coefficients and cancellation coefficients $w_{ij}$ for any antennas i and j. Further, it should be appreciated that schematic diagrams 600 and 700 can be implemented using software executed within a device or otherwise, firmware, programmable circuits, hardware, and/or any other suitable implementation.

Figure 8:
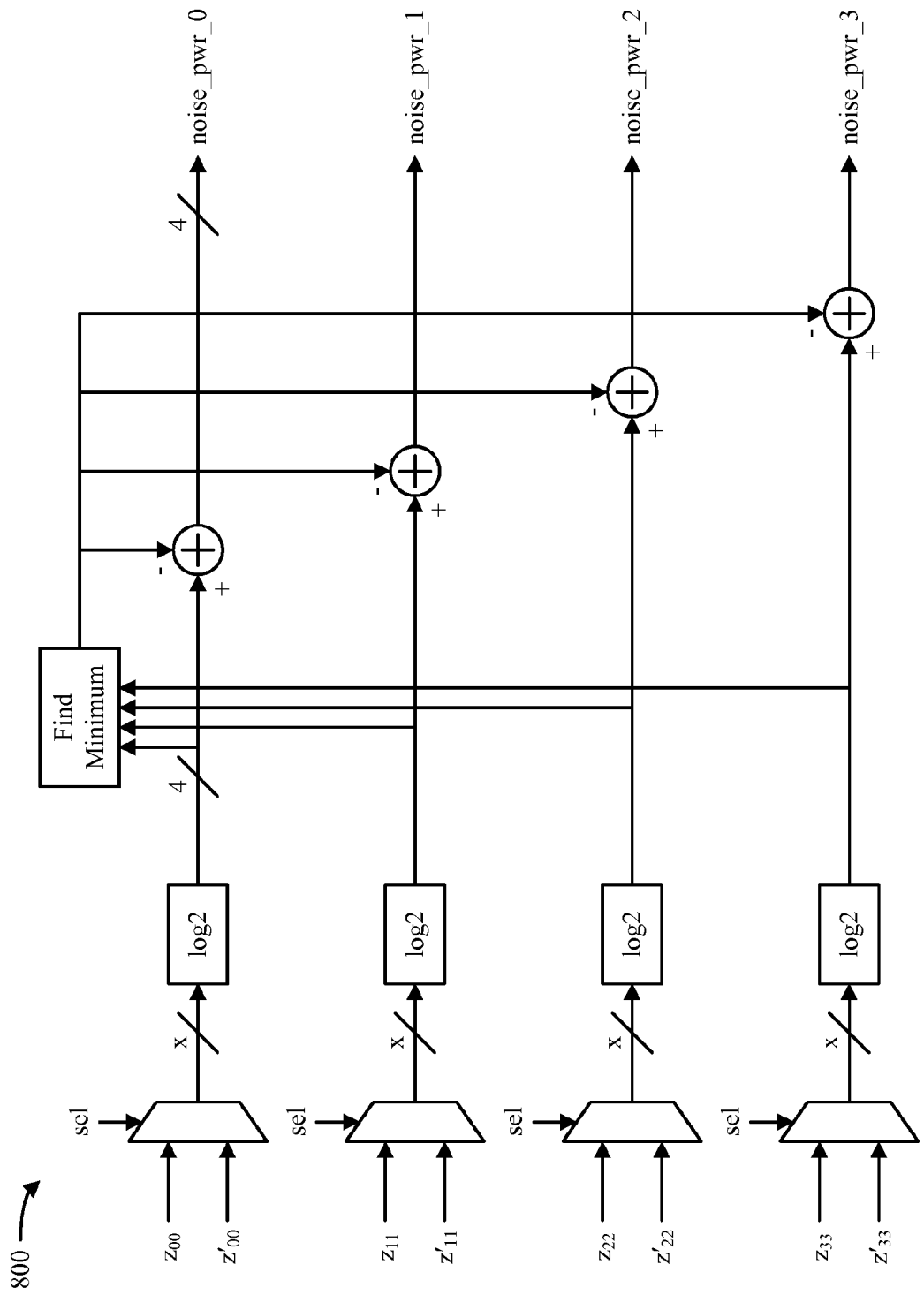
FIG. 8 is a schematic diagram that illustrates calculation of example noise weighting factors in accordance with various aspects.

Based on the calculations illustrated by FIGS. 5A, 5B, 6, and/or 7, noise weighting factors for received signals can be calculated as illustrated by diagram 800 in FIG. 8. In one example, the stages used for calculating noise weighting factors illustrated by diagram 800 can be utilized by receiver chains associated with station 200 (e.g., RXA and/or RXB) to provide more accurate alternatives to noise scaling factors internal to the receiver chains.

In accordance with an additional aspect, station 200 can perform channel estimation by computing and applying channel estimate cutoff points 226 as follows. In one example, the channel estimation techniques set forth herein take into account correlation of channel estimates across subcarriers. By doing so, raw channel estimates $H_m(k)$, which are the channel estimates for subcarrier k of receiver m and do not take into account correlation of channel estimates across subcarriers, can be improved.

It should be appreciated that the following describes a specific, non-limiting example implementation that can be utilized by station 200 for channel estimation. For example, the following implementation can be utilized for a 20 MHz communication mode. In one example, the described implementation can be extended to a 40 MHz communication mode by utilizing a 128-point FFT/IFFT instead of a 64-point FFT/IFFT and by adjusting the band edge tone numbers to the band edge tones of the 40 MHz communication mode. The following implementation can further be extended to MIMO communication modes that utilize different raw channel estimates $H_m(k)$ per spatial stream by applying the implementation to the channel estimates of each spatial stream separately.

In accordance with one aspect, a technique that can be utilized by station 200 for channel estimation can begin by obtaining one or more raw channel estimates $H_m(k)$ at, for example, sampler 210 and multiplying the raw channel estimates $H_m(k)$ by a windowing function $W(k)$ as follows:

$$S_{m0}(k)=W(k)H_m(k), \quad (19)$$

where k=0, . . . , 63. In one example, the windowing function can be implemented by the parameter computation module 220 and can minimize a Gibb's effect that is present for the raw channel estimates by removing large discontinuities in the spectrum. In another example, the windowing function $W(k)$ is equal to 1 for all tones except for 32 band edge tones.

Further, the first 16 elements of W(k) can be given by {0.0096, 0.0381, 0.0843, 0.1464, 0.2222, 0.3087, 0.4025, 0.5000, 0.5975, 0.6913, 0.7778, 0.8536, 0.9157, 0.9619, 0.9904, 1.0000}. These values can be applied to the band edge tones k={−28, −27, ..., −13} and {28, 27, ..., 13}. For all other tones, the windowing function W(k) can be equal to 1. In one example, a channel estimate $S_m(k)$ can contain unused tones. In such an example, the unused tones can be nulled, or alternatively the unused tones can be treated as noise-only values.

Next, a 64-point IFFT can be taken of all interpolated spectra $S_{m0}(k)$, which can result in channel impulse response estimates for each receiver as follows:

$$\hat{h}_{m0}(i) = \sum_{k=0}^{63} S_{m0}(k) \exp\left(j\frac{2\pi ik}{64}\right). \tag{20}$$

Based on the impulse response estimates, DC offsets can then be estimated by averaging the tail of the impulse responses over 16 samples:

$$\hat{x}_m = \frac{1}{16} \sum_{i=32}^{47} \hat{h}_{m0}(i). \tag{21}$$

The DC offsets estimated in Equation (21) can then be corrected subtracting the respective estimates from the impulse responses as follows:

$$\hat{h}_{m0}(i) = \hat{h}_{m0}(i) - \hat{x}_m. \tag{22}$$

In one example, a frequency-domain interpolation that can be used to compute the DC portion of the channel response for a MIMO channel can be computed using the interpolation function as follows:

$$c(k) = \begin{cases} \frac{1}{16} \sum_{i=32}^{47} \exp(j2\pi nk/64) & k \neq 0 \\ 0 & k = 0. \end{cases} \tag{23}$$

This interpolation can then be applied in the frequency domain prior to taking the IFFT in Equation (20):

$$\hat{x}_m = \sum_{k=0}^{63} c(k) S_{m0}(k). \tag{24}$$

In another example, after the DC offset correction illustrated by Equation (22), the channel impulse responses can be squared and summed to obtain a single combined power-delay profile that can be used for channel truncation:

$$P_h(k) = \sum_{i=0}^{7} \sum_{n=0}^{n_r} \|\hat{h}_{n0}((i+k) \bmod 64)\|^2. \tag{25}$$

In accordance with one aspect, to increase the SNR of channel estimates made by station 200, the corresponding impulse responses can be cut off at a point where a signal-to-noise-plus-truncated-power ratio for the channel estimate is maximized. In one example, parameter computation module 220 can accomplish this by estimating positive and negative channel estimate cutoff points 226. The negative cutoff point can be used, for example, to catch precursor channel contributions that can be caused by late burst timing cost function (BTCF) timing, the use of large negative cyclic shifts, and/or other factors. In one example, the cutoff points $c_p$ and $c_n$ can be calculated by parameter computation module 220 as follows:

$$c_p = \min_{k=10...47} \{k : P_h(k) < \sigma_{th} \cdot \sigma_n^2\}, \tag{26}$$

$$c_n = \min_{k=48...63} \{k-1 : P_h(k) > \sigma_{th} \cdot \sigma_n^2\}. \tag{27}$$

As used in Equations (26) and (27), a noise estimate $\sigma_n^2$ can be obtained as the power of subtracted samples of two 3.2 microsecond repetitions of a long training symbol present in a packet received by station 200. In one example, $\sigma_t$ can be a programmable threshold having a range of 1 to 4 with a resolution of 1/16. In another example, if no value of k is found for which $P_h(k)$ is below the noise threshold, $c_p$ can be set to 64 to prevent truncation.

In one example, truncation length values $c_p$ and $c_n$ can be overridden by programmable values MAX-TRUNC-LEN and MIN-TRUNC-LEN as follows. First, if the value obtained for $c_p$ is less than MIN_TRUNC_LEN, $c_p$ can instead be set equal to MIN_TRUNC_LEN. Further, if $c_p$+N−$c_n$ is greater than MAX_TRUNC_LEN, where N is equal to the number of tones in the channel estimate, $c_p$ and $c_n$ can both be set to 64 to disable truncation.

After the channel estimate cutoff points 226 $c_p$ and $c_n$ have been computed, station adjustment module 240 can be utilized to all samples between $c_p$ and $c_n$ and calculate the 64-point FFT of the truncated impulse responses. In one example, the FFT outputs are the desired channel estimates $\hat{H}_{m0}(k)$, which can be expressed as follows:

$$\hat{H}_{m0}(k) = \frac{1}{64} \sum_{i=0}^{63} \hat{h}_{n0}(i) \exp\left(-j\frac{2\pi ik}{64}\right). \tag{28}$$

Once the desired channel estimates $\hat{H}_{m0}(k)$ are obtained, they can then be multiplied by the inverse of the frequency windowing function, or $W(k)^{-1}$. In one example, inverse windowing can be omitted for the band edge tones specified above.

Finally, the band edge tones specified above can be replaced with the original raw channel estimates. In one example, the number of band edge tones that are replaced can depend on SNR due to the fact that the amount of Gibb's rippling near the band edges can decrease as SNR decreases. By way of specific example, a programmable value $\sigma_{snr}$ is used to set the SNR threshold as follows. For a desired channel estimate $\hat{H}_m^0(k)$ corresponding to a band having subcarriers {−28, −27, ..., 27, 28}, the subcarriers k for which the desired channel estimate $\hat{H}_m^0(k)$ can be set equal to the raw channel estimate $H_{raw}(k)$ can be chosen based on the relationship between the noise estimate $\sigma_n^2$ and the noise threshold $\sigma_{snr}$. For example, if $\{\max(P_h(k)) > \sigma_{snr} \cdot \sigma_n^2\}$, then the subcarriers k for which raw channel estimates can be used can include −28, −27, −26, −25, 25, 26, 27, and 28. Otherwise, the subcarriers k for which raw channel estimates can be used can include −28, −27, 27, and 28.

In sum, the above comprises example techniques that can be utilized by station 200 for channel estimation. It should be appreciated, however, that the above description is provided by way of example and not limitation and that some of the acts described above can be omitted and/or performed in a different order than described.

In accordance with yet another aspect, station 200 can compute and utilize a constellation SNR metric 228 as follows. The following techniques can be utilized, for example, by a device using a wireless link that sets or selects a data rate based on the quality of the link. For example, for a lower quality link, a lower data rate can be used to ensure that transmissions are more robust. Alternatively, for a higher quality link, a higher data rate can be selected to increase bandwidth. In one example, the highest rate that is available and results in a sufficiently low error probability on a particular wireless link can be selected. Further, measurements of error probability can be determined, for example, from a SNR of the channel. By using a SNR metric, it is possible to predict a maximum possible data rate for a given maximum packet error probability.

Accordingly, parameter computation module 220 at station 200 can compute a constellation SNR metric 228 to aid in rate selection. It should be appreciated, however, that other signal quality metrics can be used in addition to or in place of constellation SNR metric 228. In one example, constellation SNR is a better predictor for link quality than traditional signal quality indicators such as RSSI or input SNR due to the fact that the constellation SNR incorporates impairments such as noise, interference, and RF nonlinearities, whereas the traditional indicators do not.

In one example, the following procedure can be utilized by parameter computation module 220 for calculating a constellation SNR 228 for station 200. First, for a series of symbols of $N_s$ data subcarriers, the $N_s$ squared received constellation points corresponding to the symbols can be summed to obtain a signal estimate S. Data relating to the symbols can be provided to parameter computation module 220 by, for example, sampler 210 and/or another suitable module associated with station 200. Next, the $N_s$ squared distances from the received constellation points to the nearest sliced constellation points corresponding to the symbols can be summed to obtain a noise estimate N.

After obtaining signal and noise power estimates, the signal and noise powers can then be averaged over multiple symbols. As a specific example, this can be done by using a one-pole low pass filter that can operate as follows:

$$S_k = (1-\alpha)S_{k-1} + \alpha S, \quad (29)$$

$$N_k = (1-\alpha)N_{k-1} + \alpha N, \quad (30)$$

where $\alpha$ is a programmable averaging constant. In one example, $\alpha$ can be configured with a value selected from the group $\{1/64, 1/32, 1/16, 1/8, 1/4, 1/2, 1\}$. Other filters might have similar performance or other desirable features. Based on the average signal and noise powers, the parameter computation module 220 can calculate the ratio $S_k/N_k$ to obtain the constellation SNR metric 228. By way of specific example, the logarithm of the calculated ratio can additionally be performed to obtain a representation of the constellation SNR metric 228 in decibels.

In accordance with one aspect, using a low $\alpha$ value (e.g., 1/64) can result in an accurate constellation SNR estimate averaged over a series of modulation symbols. Additionally and/or alternatively, higher values can be utilized as a debugging feature to detect whether a constellation SNR for the last symbol(s) of a packet is approximately equal to the average constellation SNR. For example, if time-varying effects are present, such as voltage-controlled oscillator (VCO) ringing at the start of a packet, short interference bursts within a packet, or channel changes during a packet, these effects can cause a calculated constellation SNR metric 228 to vary for different a values.

In accordance with a further aspect, station 200 can compute and utilize a MIMO rank metric 230 as follows. Similar to the techniques described above for calculating and utilizing a constellation SNR metric 228, the techniques for calculating a MIMO rank metric 230 described herein can be utilized by a device using a wireless link that selects a data rate based on link quality. In one example, a measure of error probability for a wireless link corresponding to a MIMO channel can be determined from a metric of the rank or condition number of the channel. For example, MIMO rank metric 230 can be used to determine whether more than one spatial stream can be transmitted over a given wireless link based on a predetermined maximum packet error probability.

In one example, an approximate MIMO rank metric 230 for a MIMO channel can be calculated by parameter computation module 220 as follows. In the following description, the matrix H is used to denote an estimated MIMO channel for a given subcarrier. Data regarding the matrix H can be provided by, for example, sampler 210. Based on the channel matrix H, an $N_{ss}$-by-$N_{ss}$ matrix G can be calculated according to the following representation:

$$G = HH^H. \quad (31)$$

From the $N_{ss}$-by-$N_{ss}$ matrix G, a rank metric C can be calculated as follows:

$$C = \frac{\prod_{i=0}^{N_{ss}-1} G_{ii}}{\sum_{i=0}^{N_{ss}-1} \sum_{j=0}^{N_{ss}-1} |G_{ij}|}. \quad (32)$$

The metric provided by Equation (32) can be averaged over all subcarriers to obtain a single average MIMO rank metric 230 per packet. Based on the calculated MIMO rank metrics 230, station adjustment module 240 and/or another suitable module can be used to determine a number of spatial streams to utilize in order to obtain an optimal data rate.

In another example, parameter computation module 220 can perform QR decomposition on each estimated MIMO channel according to H=QR, where R is an $N_{ss}$-by-$N_{ss}$ upper triangular matrix. Based on this, parameter computation module 220 can alternatively calculate a rank metric C as follows:

$$C = \frac{\prod_{j=0}^{N_{ss}-1} R_{jj}^2}{\sum_{i=0}^{N_{ss}-1} \sum_{j=i}^{N_{ss}-1} |R_{ij}|^2}. \quad (33)$$

Rank metrics obtained using Equation (33) can then be averaged over all subcarriers to obtain a single average MIMO rank metric 230 per packet in a similar manner to that described with regard to Equation (32).

In an example where $N_{ss}=2$, it can be appreciated that, up to a scaling factor, C is the harmonic mean of the non-zero singular values of the channel matrix. Accordingly, when the singular values are equal, the rank metric is equal to the singular values. In contrast, when one singular value is significantly larger than the other, the rank metric can be approximately equal to the smaller singular value.

Referring to FIGS. 9-14, methodologies that can be performed in accordance with various aspects described herein are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 9:
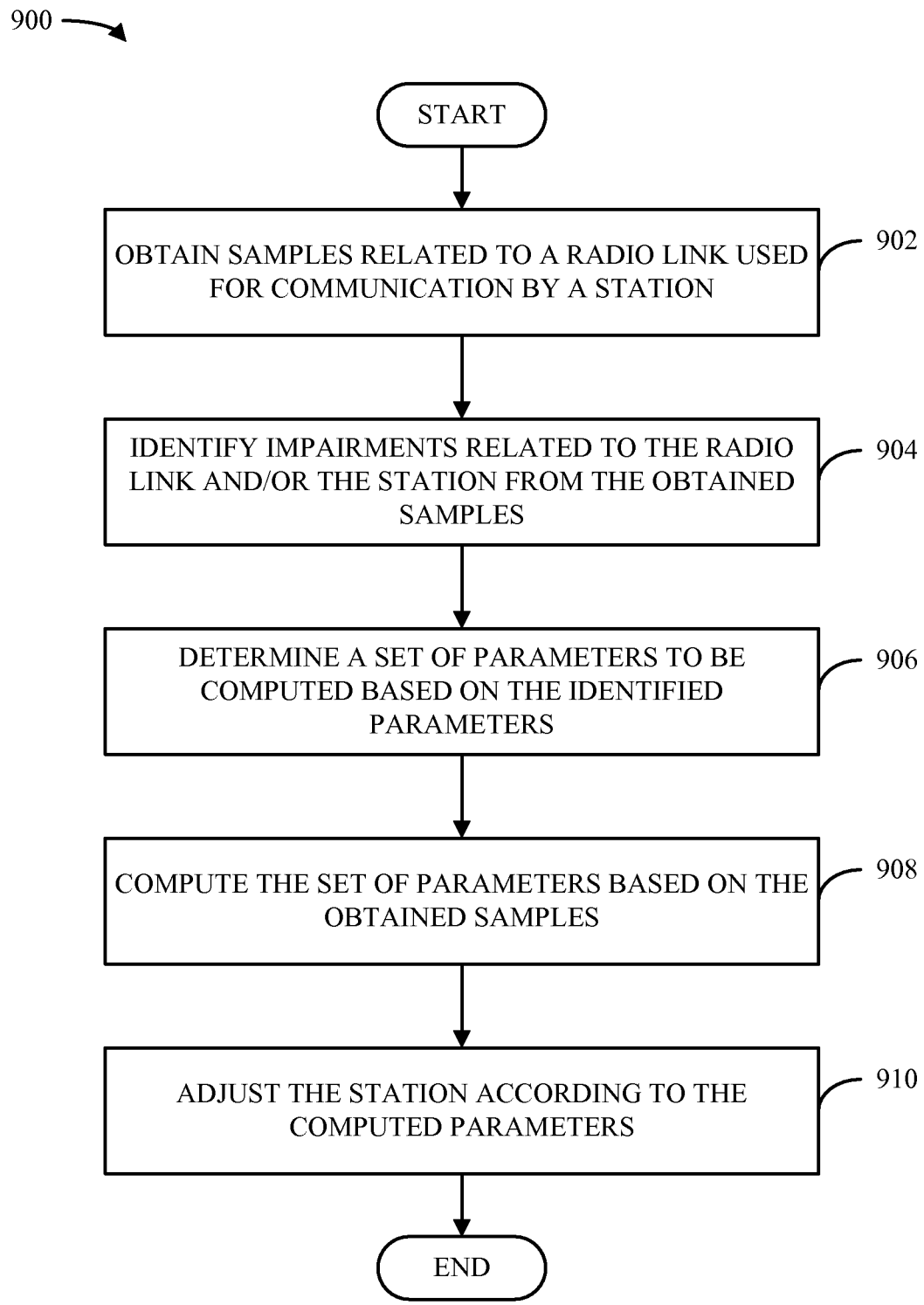
FIG. 9 is a flow diagram of a methodology for processing signals at a station in a wireless communication system.

With reference to FIG. 9, illustrated is a methodology 900 for processing signals at a station (e.g., access point 100 and/or access terminals 116 or 122) in a wireless communication system (e.g., system 100). Methodology 900 begins at block 902, wherein samples related to a radio link used for communication by a station are obtained (e.g., by a sampler 210). Samples obtained at block 902 can correspond to, for example, signals received at one or more antennas associated with a station for which methodology 900 is performed, channel information, and/or other suitable information.

Next, at block 904, one or more impairments related to the radio link and/or the station are identified from the samples obtained at block 902. In one example, impairments identified at block 904 can include I/Q phase and/or amplitude imbalance at the station, channel estimation errors, interference, and the like. Based on the impairments identified at block 904, a set of parameters to be computed (e.g., by a parameter computation module 220) can then be determined at block 906. Parameters that can be selected at block 906 include I/Q calibration coefficients (e.g., I/Q correction factors 222), interference cancellation weights (e.g., interference cancellation coefficients 224), channel truncation values (e.g., channel estimate cutoff points), channel quality indicators (e.g., constellation SNR metrics 228 and/or MIMO rank metrics 230), and/or other suitable parameters.

Upon identifying a set of parameters to be compute at block 906, the set of parameters can be computed at block 908 (e.g., by the parameter computation module 220) based on the samples obtained at block 902. Parameters can be computed at block 908, for example, using one or more techniques described above with respect to FIGS. 2-8 and/or one or more other appropriate techniques. Methodology 900 can then conclude at block 910, wherein the station is adjusted (e.g., by a station adjustment module 240) according to the parameters computed at block 908. By performing adjustments at block 910, correction for impairments identified at block 904 and/or one or more other effects can be produced at a station for which methodology 900 is performed. For example, I/Q correction factors computed at block 908 can be applied at block 910 to correct for I/Q imbalance identified at block 904. As another example, channel quality indicators computed at block 908 can be utilized at block 910 to select a data rate and/or a number of spatial streams that will be used by the station for communication.

Figure 10:
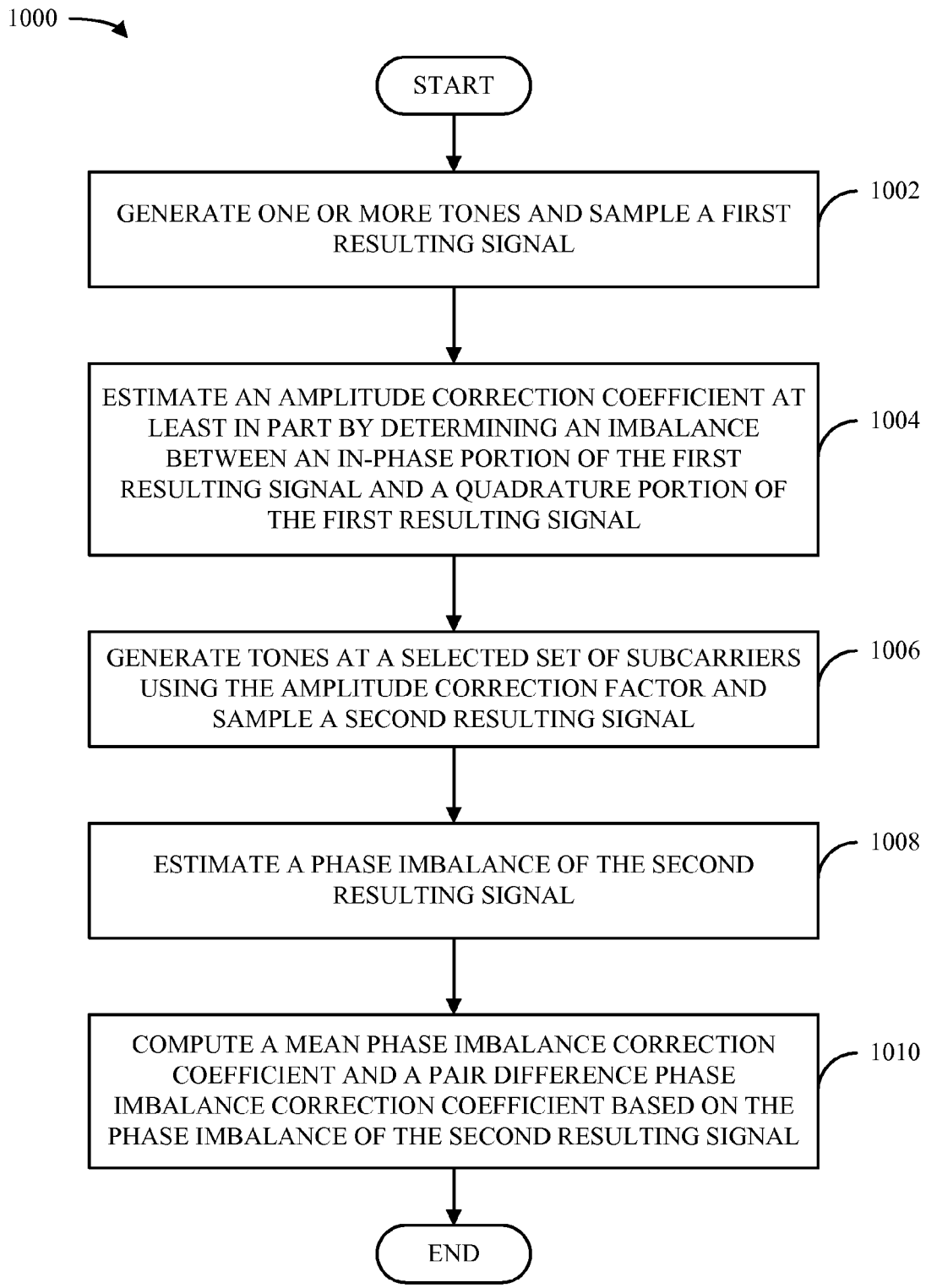
FIG. 10 is a flow diagram of a methodology for performing I/Q calibration at a wireless station.

FIG. 10 illustrates a methodology 1000 for performing I/Q calibration at a wireless station (e.g., station 200). Methodology 1000 begins at block 1002, wherein one or more tones are generated and a first resulting signal is sampled (e.g., by a sampler 210). Next, at block 1004, an amplitude correction coefficient is estimated (e.g., by a parameter computation module 220) at least in part by determining an imbalance between an in-phase portion and a quadrature portion of the first resulting signal sampled at block 1002.

Methodology 1000 can then proceed to block 1006, where tones are generated at a selected set of subcarriers using the amplitude correction factor estimated at block 1004 and a second resulting signal is sampled (e.g., by sampler 210). At block 1008, a phase imbalance of the second resulting signal can then be estimated. In accordance with one aspect, a phase imbalance present at a wireless station for which methodology 1000 is performed can be approximated using a finite impulse response (FIR). This FIR can be, for example, a 3-tap FIR having correction coefficients corresponding to the respective taps. Accordingly, methodology 1000 can conclude at block 1010, wherein a mean phase imbalance correction coefficient and a pair difference phase imbalance correction coefficient are computed (e.g., by parameter computation module 220) based on the phase imbalance estimated at block 1008.

Figure 11:
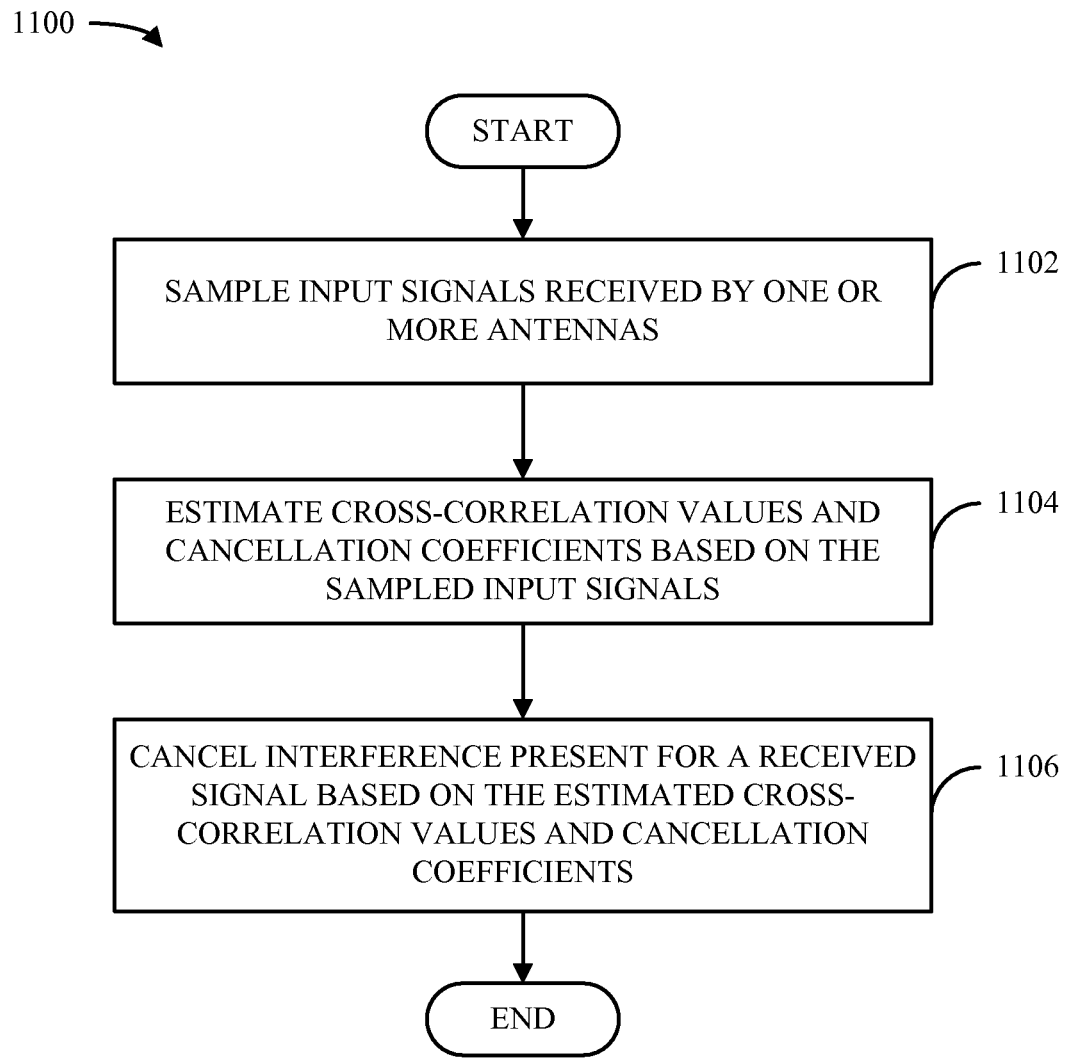
FIG. 11 is a flow diagram of a methodology for performing interference cancellation at a wireless station.

FIG. 11 illustrates a methodology 1100 for performing interference cancellation at a wireless station. Methodology 1100 begins at block 1102, wherein input signals received by one or more antennas are sampled (e.g., by sampler 210). Methodology 1100 then proceeds to 1104, wherein cross-correlation values and cancellation coefficients are estimated (e.g., by parameter computation module 220) based on the input signals sampled at block 1102. Methodology 1100 can then conclude at block 1106 by canceling interference present for a received signal (e.g., via a station adjustment module 240) based on the cross-correlation values and cancellation coefficients estimated at block 11104.

Figure 12:
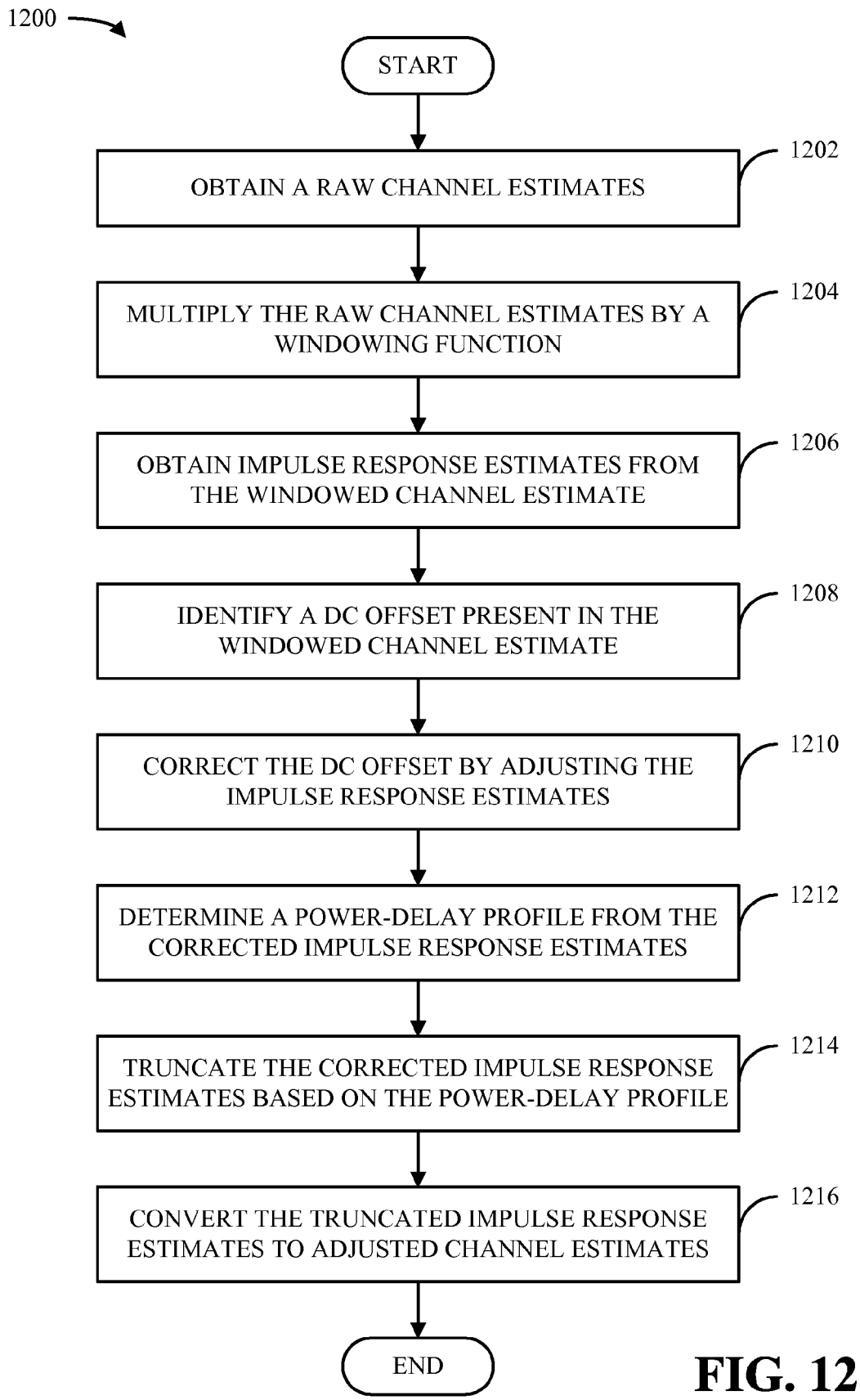
FIG. 12 is a flow diagram of a methodology for performing channel estimation at a wireless station.

FIG. 12 illustrates a methodology 1200 for performing channel estimation at a wireless station. Methodology 1200 begins at block 1202, wherein raw channel estimates are obtained (e.g., at sampler 210). Next, at block 1204, the raw channel estimates obtained at block 1202 are multiplied by a windowing function (e.g., by parameter computation module 220). At block 1206, impulse response estimates are then obtained from the windowed channel estimate created at block 1204. Methodology 1200 then proceeds to block 1208, wherein a DC offset present in the windowed channel estimate is identified. This DC offset is then corrected at block 1210 by adjusting the impulse response estimates obtained at block 1206. Next, at block 1212, a power-delay profile is determined from the corrected impulse response estimates obtained at block 1210. At block 1214, the corrected impulse response estimates are truncated based on the power-delay profile determined at block 1212. Finally, methodology 1200 can conclude at block 1216, wherein the truncated impulse response estimates created at block 1214 are converted to adjusted channel estimates.

Figure 13:
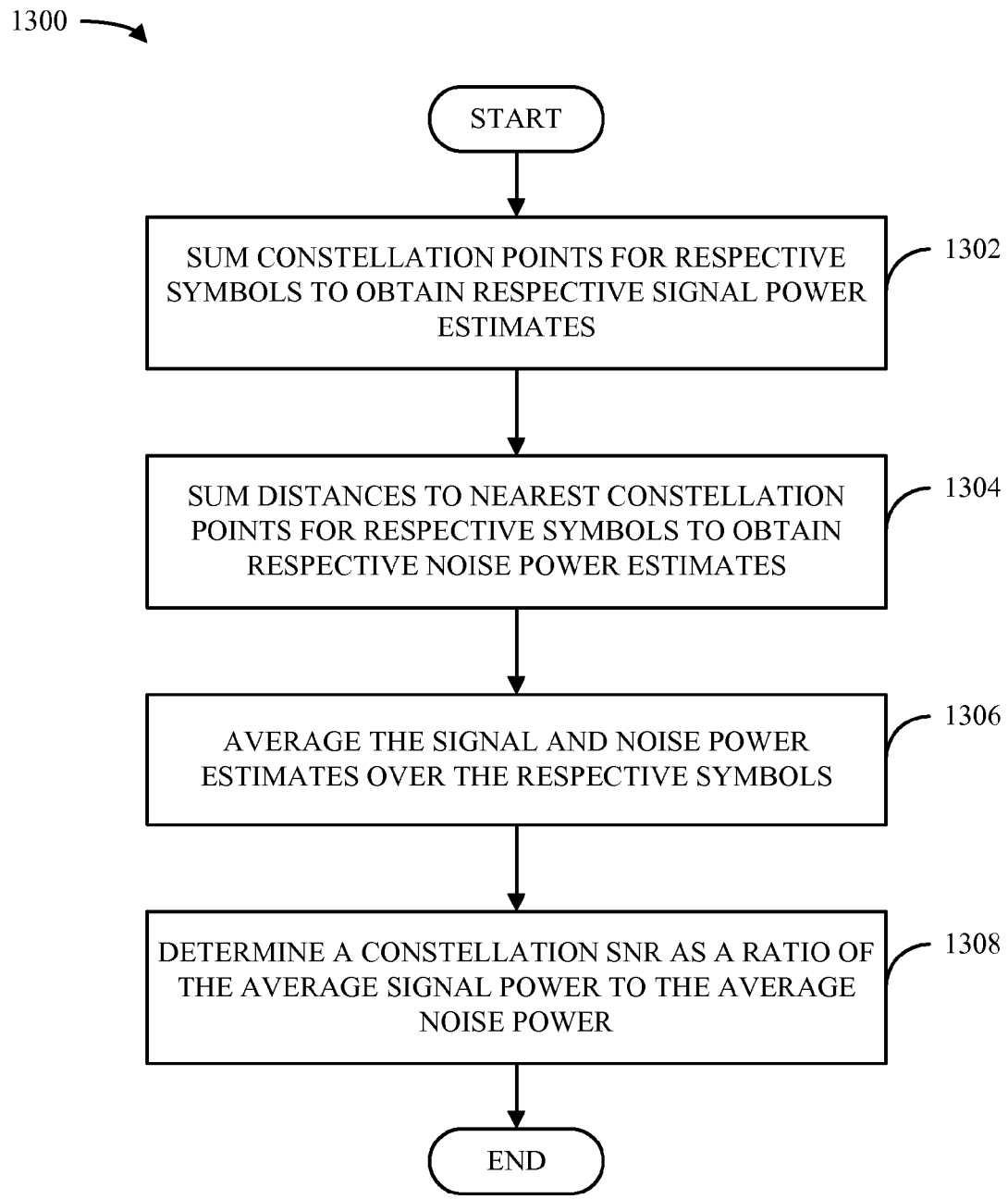
FIG. 13 is a flow diagram of a methodology for calculating a constellation signal-to-noise ratio.

FIG. 13 illustrates a methodology 1300 for calculating a constellation signal-to-noise ratio (e.g., at a wireless station 200). Methodology 1300 can begin at block 1302, wherein constellation points for respective symbols are summed to obtain respective signal power estimates. Next, at block 1304, distances to nearest constellation points for the respective symbols are summed to obtain respective noise power estimates. At block 1306, the signal and noise power estimates obtained at blocks 1302 and 1304 are then averaged over the respective symbols. Methodology 1300 can then conclude at block 1308, where a constellation SNR is determined as a ratio of the average signal power to the average noise power.

Figure 14:
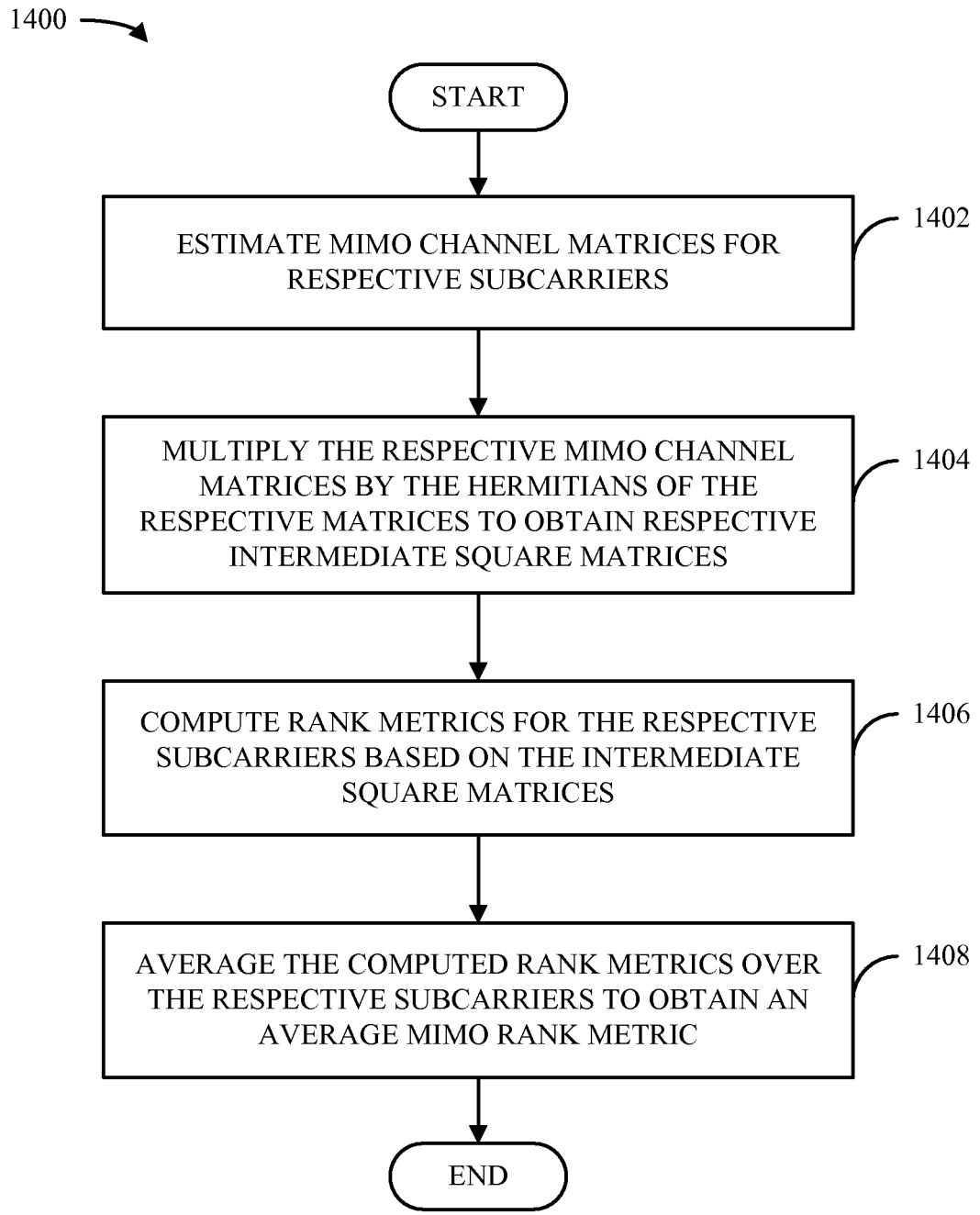
FIG. 14 is a flow diagram of a methodology for calculating a MIMO rank metric.

FIG. 14 illustrates a methodology 1400 for calculating a multiple-input multiple-output (MIMO) rank metric (e.g., at a wireless station 200). Methodology 1400 can begin at block

1402, wherein MIMO channel matrices are estimated for respective subcarriers. Methodology 1400 can then proceed to block 1404, wherein the MIMO channel matrices obtained at block 1402 are multiplied by their respective Hermitians to obtain respective intermediate square matrices. In one example, the Hermitians for the respective MIMO channel matrices can be obtained by performing a Hermitian operation on the respective MIMO channel matrices to obtain Hermitian matrices. Next, at block 1406, rank metrics are computed for the respective subcarriers based on the intermediate square matrices obtained at block 1404. In one example, computation at block 1406 can include performing QR decompositions for the respective intermediate square matrices to obtain intermediate upper triangular matrices and computing the rank matrices based on the intermediate upper triangular matrices. Methodology 1400 can then conclude at block 1408, wherein the rank matrices computed at block 1406 are averaged over the respective subcarriers to obtain an average MIMO rank metric.

Figure 15:
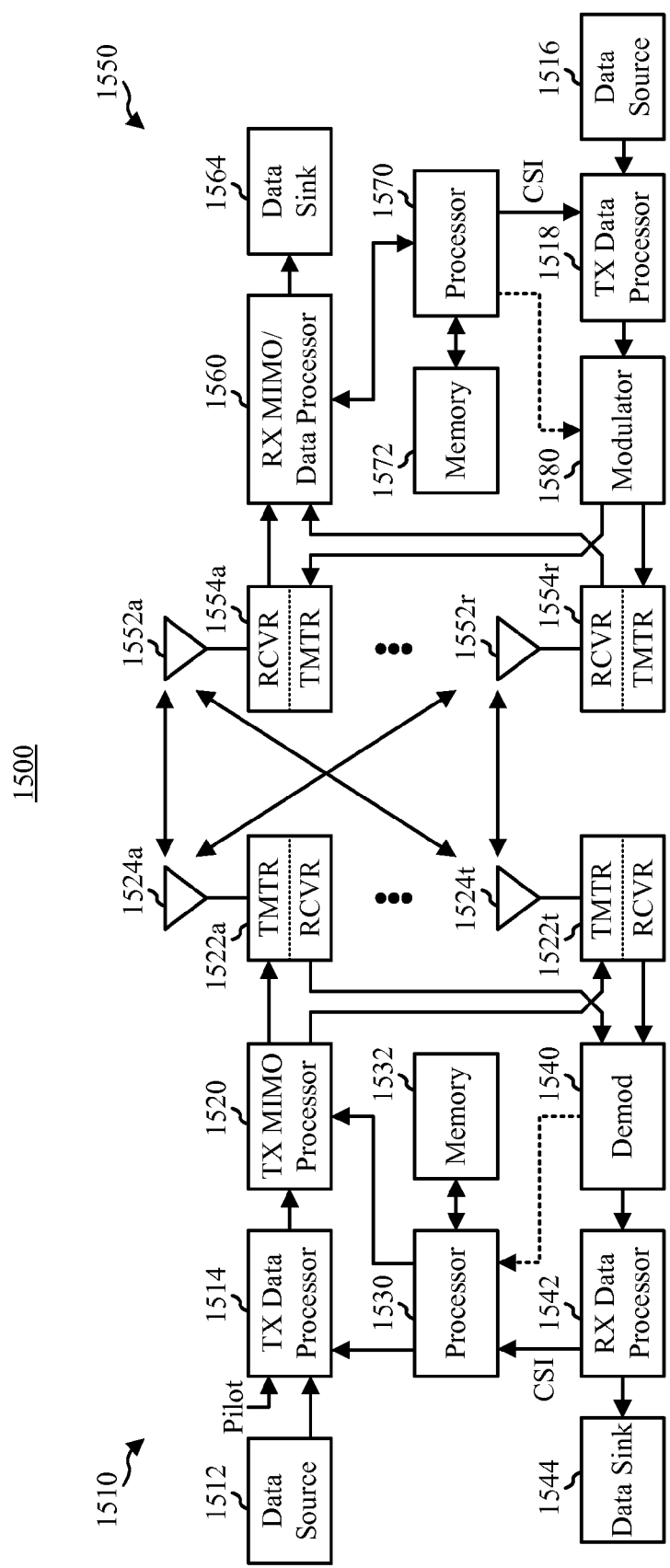
FIG. 15 is a block diagram illustrating an example wireless communication system in which one or more aspects described herein can function.

Referring now to FIG. 15, a block diagram illustrating an example wireless communication system 1500 in which one or more embodiments described herein can function is provided. In one example, system 1500 is a multiple-input multiple-output (MIMO) system that includes a transmitter system 1510 and a receiver system 1550. It should be appreciated, however, that transmitter system 1510 and/or receiver system 1550 could also be applied to a multi-input single-output (MISO) system wherein, for example, multiple transmit antennas (e.g., on a base station), can transmit one or more symbol streams to a single antenna device (e.g., a mobile station). Additionally, it should be appreciated that aspects of transmitter system 1510 and/or receiver system 1550 described herein could be utilized in connection with a single output to single input (SISO) antenna system.

In accordance with one aspect, traffic data for a number of data streams are provided at transmitter system 1510 from a data source 1512 to a transmit (TX) data processor 1514. In one example, each data stream can then be transmitted via a respective transmit antenna 1524. Additionally, TX data processor 1514 can format, code, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1550 to estimate channel response. Back at transmitter system 1510, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1530.

Next, modulation symbols for all data streams can be provided to a TX processor 1520, which can further process the modulation symbols (e.g., for orthogonal frequency division multiplexing or OFDM). TX MIMO processor 1520 can then provides $N_T$ modulation symbol streams to $N_T$ transceivers 1522a through 1522t. In one example, each transceiver 1522 can receive and process a respective symbol stream to provide one or more analog signals. Each transceiver 1522 can then further condition (e.g., amplify, filter, and upconvert) the analog signals to provide a modulated signal suitable for transmission over a MIMO channel. Accordingly, $N_T$ modulated signals from transceivers 1522a through 1522t can then be transmitted from $N_T$ antennas 1524a through 1524t, respectively.

In accordance with another aspect, the transmitted modulated signals can be received at receiver system 1550 by $N_R$ antennas 1552a through 1552r. The received signal from each antenna 1552 can then be provided to respective transceivers 1554. In one example, each transceiver 1554 can condition (e.g., filter, amplify, and downconvert) a respective received signal, digitize the conditioned signal to provide samples, and then processes the samples to provide a corresponding "received" symbol stream. An RX MIMO/data processor 1560 can then receive and process the $N_R$ received symbol streams from $N_R$ transceivers 1554 based on a particular receiver processing technique to provide $N_T$ "detected" symbol streams. In one example, each detected symbol stream can include symbols that are estimates of the modulation symbols transmitted for the corresponding data stream. RX processor 1560 can then process each symbol stream at least in part by demodulating, deinterleaving, and decoding each detected symbol stream to recover traffic data for a corresponding data stream. Thus, the processing by RX processor 1560 can be complementary to that performed by TX MIMO processor 1520 and TX data processor 1514 at transmitter system 1510. RX processor 1560 can additionally provide processed symbol streams to a data sink 1564.

In accordance with one aspect, the channel response estimate generated by RX processor 1560 can be used to perform space/time processing at the receiver, adjust power levels, change modulation rates or schemes, and/or other appropriate actions. Additionally, RX processor 1560 can further estimate channel characteristics such as, for example, signal-to-noise-and-interference ratios (SNRs) of the detected symbol streams. RX processor 1560 can then provide estimated channel characteristics to a processor 1570. In one example, RX processor 1560 and/or processor 1570 can further derive an estimate of the "operating" SNR for the system. Processor 1570 can then provide channel state information (CSI), which can comprise information regarding the communication link and/or the received data stream. This information can include, for example, the operating SNR. The CSI can then be processed by a TX data processor 1518, modulated by a modulator 1580, conditioned by transceivers 1554a through 1554r, and transmitted back to transmitter system 1510. In addition, a data source 1516 at receiver system 1550 can provide additional data to be processed by TX data processor 1518.

Back at transmitter system 1510, the modulated signals from receiver system 1550 can then be received by antennas 1524, conditioned by transceivers 1522, demodulated by a demodulator 1540, and processed by a RX data processor 1542 to recover the CSI reported by receiver system 1550. In one example, the reported CSI can then be provided to processor 1530 and used to determine data rates as well as coding and modulation schemes to be used for one or more data streams. The determined coding and modulation schemes can then be provided to transceivers 1522 for quantization and/or use in later transmissions to receiver system 1550. Additionally and/or alternatively, the reported CSI can be used by processor 1530 to generate various controls for TX data processor 1514 and TX MIMO processor 1520. In another example, CSI and/or other information processed by RX data processor 1542 can be provided to a data sink 1544.

In one example, processor 1530 at transmitter system 1510 and processor 1570 at receiver system 1550 direct operation at their respective systems. Additionally, memory 1532 at transmitter system 1510 and memory 1572 at receiver system 1550 can provide storage for program codes and data used by processors 1530 and 1570, respectively. Further, at receiver system 1550, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 16:
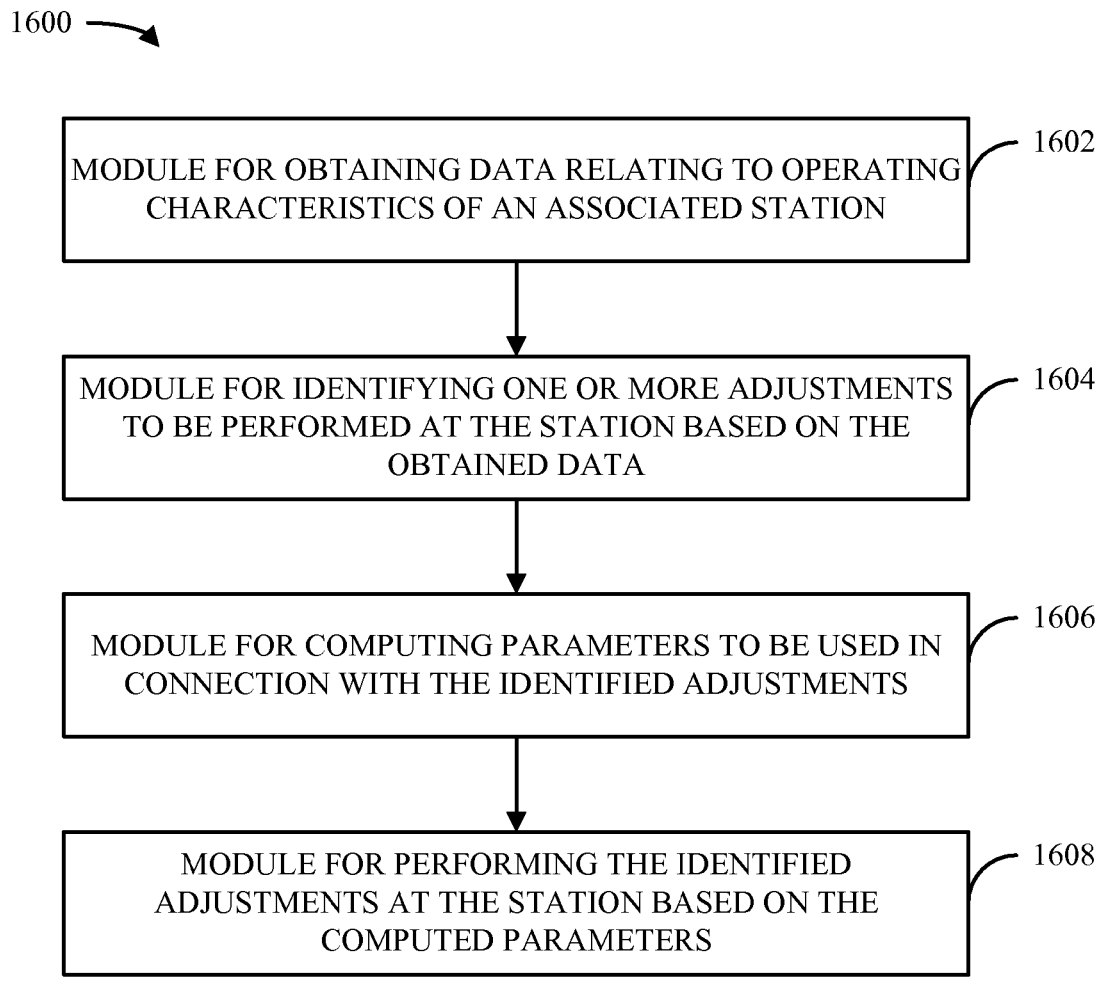
FIG. 16 is a block diagram of an apparatus that facilitates adjustment of a device operating in a wireless communication system.

FIG. 16 illustrates an apparatus 1600 that facilitates adjustment of a device (e.g., access point 100 and/or or access terminals 116 or 122) operating in a wireless communication system (e.g., system 100). It is to be appreciated that apparatus 1600 is represented as including functional blocks, which can be functional blocks that represent functions implemented by a processor, software, or combination thereof (e.g., firmware). Apparatus 1600 can include a module 1602 for obtaining data relating to operating characteristics of an associated station, a module 1604 for identifying one or more adjustments to be performed at the station based on the obtained data, a module 1606 for computing parameters to be used in connection with the identified adjustments, and a module 1608 for performing the identified adjustments at the station based on the computed parameters.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be non-exclusive.

What is claimed is:

1. A method for processing data at a wireless station, comprising:
obtaining samples related to a radio link utilized by a wireless station for communication, wherein the obtaining samples comprises estimating multiple-input multiple-output (MIMO) channel matrices for subcarriers;
identifying one or more impairments from the obtained samples;
identifying a maximum packet error probability;
computing one or more parameters based at least in part on the obtained samples and the identified impairments, the parameters comprising one or more items selected from a multi-item list, the list including an in-phase and quadrature (I/Q) imbalance correction factor, an interference cancellation coefficient, a channel estimate truncation point, a constellation signal-to-noise ratio (SNR) metric and a multiple-input multiple-output (MIMO) channel rank metric comprising an average MIMO rank metric for the subcarriers for each packet, and wherein the computing comprises multiplying the respective MIMO channel matrices by their respective Hermitians to obtain respective intermediate square matrices, computing rank metrics for the subcarriers based on the intermediate square matrices, and averaging the computed rank metrics over the subcarriers to obtain the average MIMO rank metric; and
adjusting the wireless station based on the one or more computed parameters including at least the MIMO channel rank metric, wherein adjusting the wireless station comprises using the MIMO channel rank metric and the maximum packet error probability to determine whether more than one spatial stream can be transmitted over the radio link.

2. The method of claim 1, wherein the obtaining samples comprises generating a tone at a selected subcarrier and sampling a resulting signal, the identifying comprises identifying an amplitude imbalance between an I component and a Q component of the resulting signal, wherein the I/Q imbalance correction factor comprises an I/Q amplitude imbalance correction factor, and the computing comprises estimating the I/Q amplitude imbalance correction factor at least in part by dividing a real part of a root mean square (RMS) value of the I component of the resulting signal by an RMS value of the Q component of the resulting signal.

3. The method of claim 1, wherein:
the obtaining samples comprises transmitting a first signal having a tone at an I component and a silent Q component, measuring a resulting signal of the first signal, transmitting a second signal having a tone at a Q component and a silent I component, and measuring a resulting signal of the second signal;
the identifying comprises identifying an amplitude imbalance between the resulting signal of the first signal and the resulting signal of the second signal, wherein the I/Q imbalance correction factor comprises an I/Q amplitude imbalance correction factor; and
the computing comprises estimating the I/Q amplitude imbalance correction factor at least in part by dividing a root mean square (RMS) value of the resulting signal of the first signal by an RMS value of the resulting signal of the second signal.

4. The method of claim 1, wherein:
the identifying comprises identifying I/Q phase imbalance associated with the wireless station;
the computing comprises approximating the I/Q phase imbalance using a finite impulse response (FIR) filter, the FIR filter having associated FIR coefficients, and computing the associated FIR coefficients; and the adjusting comprises applying the FIR coefficients to an I/Q modulator or an I/Q demodulator associated with the wireless station.

5. The method of claim 4, wherein the FIR coefficients comprise a mean phase imbalance FIR coefficient and a slope phase imbalance FIR coefficient, and the computing further comprises determining the mean phase imbalance FIR coefficient by computing a mean of the I/Q phase imbalance across frequency and selecting the slope phase imbalance FIR coefficient to represent an approximately linear variation in the I/Q phase imbalance across frequency around the mean of the I/Q phase imbalance.

6. The method of claim 5, wherein the identifying further comprises selecting a set of subcarriers such that no two subcarriers in the set of subcarriers are an equal distance from a zero subcarrier and identifying I/Q phase imbalances for pairs of positive and negative subcarriers in the set of subcarriers, and the selecting the slope phase imbalance FIR coefficient comprises selecting the slope phase imbalance FIR coefficient at least in part by computing averages of the I/Q phase imbalances for the pairs of positive and negative subcarriers in the set of subcarriers.

7. The method of claim 1, wherein the obtaining samples comprises sampling respective input signals from one or more antennas, the identifying comprises identifying interference present in the respective input signals, and the computing comprises estimating one or more cross-correlation values and one or more cancellation coefficients based on the respective input signals.

8. The method of claim 7, wherein the adjusting comprises canceling the identified interference based on the estimated cross-correlation values and cancellation coefficients.

9. The method of claim 8, wherein the computing further comprises comparing the cross-correlation values to a threshold and the canceling the identified interference based on the estimated cross-correlation values and cancellation coefficients is performed if one or more cross-correlation values exceeds the threshold.

10. The method of claim 8, wherein the adjusting further comprises determining a cancellation signal and injecting the cancellation signal to a receiver chain prior to an automatic gain control block or a receiver block.

11. The method of claim 7, wherein the computing further comprises estimating a minimum output power level and calculating power correction factors based on combined noise and interference levels of the respective input signals and the minimum output power level, and the adjusting further comprises balancing the power levels of the respective input signals based at least in part on the power correction factors.

12. The method of claim 7, wherein the computing further comprises maintaining respective moving averages of samples obtained from the respective input signals and calculating cross-correlation values and cancellation coefficients based on the respective moving averages.

13. The method of claim 7, wherein the computing further comprises estimating the one or more cancellation coefficients to maximize a signal-to-interference-plus-noise ratio (SINR) of packets received from an identified source.

14. The method of claim 1, wherein the obtaining samples comprises obtaining raw channel estimates and the computing comprises multiplying the raw channel estimates by a windowing function to obtain windowed channel estimates, generating an inverse FFT (IFFT) of the windowed channel estimates to obtain channel impulse response estimates, determining a power-delay profile from the channel impulse response estimates by squaring the channel impulse response estimates and summing the squared estimates over one or more receivers, calculating a positive cutoff point and a negative cutoff point based on the power-delay profile, truncating the channel impulse response estimates using the positive cutoff point and the negative cutoff point, and converting the truncated impulse response estimates to adjusted channel estimates.

15. The method of claim 14, wherein the computing further comprises estimating a DC offset present in the channel impulse response estimates and correcting the DC offset by adjusting the channel impulse response estimates.

16. The method of claim 14, further comprising comparing a length between the positive cutoff point and the negative cutoff point to a maximum truncation length and the truncating the channel impulse response estimates is performed if the length between the positive cutoff point and the negative cutoff point is less than or equal to the maximum truncation length.

17. The method of claim 14, further comprising comparing a length between the positive cutoff point and the negative cutoff point to a minimum truncation length and adjusting at least one of the positive cutoff point and the negative cutoff point if the length between the positive cutoff point and the negative cutoff point is less than the minimum truncation length.

18. The method of claim 14, wherein the computing further comprises replacing band edge tones in the adjusted channel estimates with band edge tones in the raw channel estimates.

19. The method of claim 1, wherein the obtaining samples comprises sampling data relating to received constellation points and distances from the received constellation points to nearest sliced constellation points corresponding to one or more symbols and the computing comprises summing the received constellation points for respective symbols to obtain respective signal power estimates, summing the distances from the received constellation points to the nearest sliced constellation points for the respective symbols to obtain respective noise power estimates, averaging the signal power estimates and the noise power estimates over the respective symbols, and determining a constellation signal-to-noise ratio (SNR) as a ratio of the average signal power to the average noise power.

20. The method of claim 19, wherein the averaging comprises averaging the signal power estimates and the noise power estimates using a one-pole low pass filter and a programmable averaging constant.

21. The method of claim 19, wherein the adjusting comprises selecting a data rate for communication based on the maximum packet error probability and the constellation SNR.

22. The method of claim 1, wherein the computing further comprises performing QR decomposition for the respective MIMO channel matrices to obtain corresponding intermediate upper triangular matrices and computing the rank metrics for the subcarriers based on the intermediate upper triangular matrices.

23. A wireless communications apparatus, comprising:
a memory that stores data relating to a radio link utilized for communication by the wireless communications apparatus, one or more samples relating thereto and MIMO channel matrices for subcarriers; and
a processor configured to:
identify adjustments to be performed at the wireless communications apparatus based on the one or more samples;

identify one or more impairments;

identify a maximum packet error probability;

compute one or more parameters for the adjustments from a list, the list comprising an I/Q correction coefficient, an interference cancellation factor, a channel estimate cutoff point, a channel quality indicator and a multiple-input multiple-output (MIMO) channel rank metric comprising an average MIMO rank metric for the subcarriers for each packet, wherein the computing comprises obtaining Hermitian matrices for respective MIMO channel matrices, multiplying the respective MIMO matrices by their respective Hermitian matrices to obtain intermediate matrices, computing metrics for the subcarriers based on the intermediate matrices, and averaging channel rank metrics computed for the subcarriers over the subcarriers to determine the average MIMO rank metric; and perform the identified adjustments, wherein performing the identified adjustments comprises using the MIMO channel rank metric and the maximum packet error probability to determine whether more than one spatial stream can be transmitted over the radio link.

24. The wireless communications apparatus of claim 23, wherein the memory further stores data relating to a signal resulting from generation of a tone at a predetermined subcarrier and the processor is further configured to identify an amplitude imbalance between an I component and a Q component of the signal, wherein the I/Q correction coefficient comprises an amplitude correction factor, and to compute the amplitude correction factor at least in part by dividing a root mean square (RMS) value of the I component of the signal by an RMS value of the Q component of the signal.

25. The wireless communications apparatus of claim 23, wherein the memory further stores data relating to an I signal resulting from a signal generated using an I-component tone and a Q signal resulting from a signal generated using a Q-component tone, and the processor is further configured to identify an amplitude imbalance between the I signal and the Q signal, wherein the I/Q correction coefficient comprises an amplitude correction factor, and to compute the amplitude correction factor at least in part by dividing a root mean square (RMS) value of the I signal by an RMS value of the Q signal.

26. The wireless communications apparatus of claim 23, wherein the memory further stores data relating to a signal resulting from generation of tones at a group of subcarriers selected such that no subcarriers in the group of subcarriers share a common distance from a zero subcarrier, and the processor is further configured to identify a phase imbalance between an I component and a Q component of the signal and to approximate the phase imbalance using a FIR filter having a mean phase correction factor and a pair difference phase correction factor.

27. The wireless communications apparatus of claim 26, wherein the processor is further configured to determine the mean phase correction factor as a mean of the phase imbalance across frequency and to select the pair difference phase correction factor as an approximation of a linear phase imbalance variation with respect to frequency.

28. The wireless communications apparatus of claim 27, wherein the processor is further configured to select the pair difference phase correction factor at least in part by computing respective averages of phase imbalances for pairs of positive and negative subcarriers in the group of subcarriers.

29. The wireless communications apparatus of claim 23, wherein the memory further stores data relating to signals received at one or more antennas and the processor is further configured to identify interference in the respective signals and to estimate cross-correlation values and cancellation coefficients based on the respective signals.

30. The wireless communications apparatus of claim 29, wherein the processor is further configured to apply the cancellation coefficients to the signals to cancel the identified interference.

31. The wireless communications apparatus of claim 30, wherein the processor is further configured to monitor the cross-correlation values in relation to a threshold and to apply the cancellation coefficients to the signal upon determining that a cross-correlation value exceeds the threshold.

32. The wireless communications apparatus of claim 29, wherein the processor is further configured to apply the cancellation coefficients to the signals by generating one or more cancellation signals and injecting the cancellation signals into respective receiver chains corresponding to the signals.

33. The wireless communications apparatus of claim 29, wherein the processor is further configured to balance respective power levels of the signals.

34. The wireless communications apparatus of claim 33, wherein the processor is further configured to estimate a minimum power output level, to calculate power correction factors based on combined noise and interference levels of the respective signals and the minimum power output level, and to balance the power levels of the respective signals based on the power correction factors.

35. The wireless communications apparatus of claim 29, wherein the processor is further configured to maintain moving averages of samples obtained from the input signals and to calculate the cross-correlation values and cancellation coefficients based at least in part on the maintained moving averages.

36. The wireless communications apparatus of claim 23, wherein the memory further stores data relating to one or more raw channel estimates and the processor is further configured to window the raw channel estimates based on a windowing function, to perform an IFFT for windowed channel estimates to obtain channel impulse response estimates, to determine a power-delay profile from the channel impulse response estimates by squaring the channel impulse response estimates and summing the squared estimates over one or more receivers, to truncate the channel response estimates based on the power-delay profile, and to convert the truncated impulse response estimates to adjusted channel estimates.

37. The wireless communications apparatus of claim 36, wherein the processor is further configured to estimate and correct a DC offset present in the channel impulse response estimates.

38. The wireless communications apparatus of claim 36, wherein the processor is further configured to null unused tones in the raw channel estimates.

39. The wireless communications apparatus of claim 36, wherein the memory further stores data relating to a positive truncation value and a negative truncation value and the processor is further configured to truncate the channel impulse response estimates at the positive truncation value and the negative truncation value.

40. The wireless communications apparatus of claim 23, wherein the memory further stores data relating to received constellation points corresponding to one or more symbols and distances from the received constellation points to respective nearest sliced constellation points and the processor is further configured to sum the received constellation points for the one or more symbols to obtain respective signal power estimates, to sum the distances from the received constellation points to the respective nearest sliced constellation points to obtain respective noise power estimates, to obtain an average signal power estimate and an average noise power estimate over the one or more symbols, and to divide the average signal power estimate by the average noise power estimate to obtain a constellation SNR metric.

41. The wireless communications apparatus of claim 40, wherein the processor is further configured to obtain the average signal power estimate and the average noise power estimate using a one-pole low pass filter.

42. The wireless communications apparatus of claim 40, wherein the memory further stores data relating to the maximum packet error probability and the processor is further configured to set a data rate based on the maximum packet error probability and the constellation SNR metric.

43. The wireless communications apparatus of claim 23, wherein the processor is further configured to perform QR decomposition for the respective MIMO channel matrices to obtain corresponding intermediate upper triangular matrices and to compute the rank metrics for the subcarriers based on the intermediate upper triangular matrices.

44. An apparatus that facilitates signal processing in a wireless communication system, comprising:
    means for obtaining data relating to operating characteristics of the apparatus, wherein the means for obtaining data comprises means for estimating multiple-input multiple-output (MIMO) channel matrices for subcarriers;
    means for identifying one or more impairments;
    means for identifying a maximum packet error probability;
    means for identifying one or more adjustments to be performed at the apparatus based on the obtained data;
    means for computing parameters selected from a group to be used in connection with the identified adjustments, the group comprising I/Q correction factors, interference cancellation coefficients, channel estimate cutoff points, constellation SNR metrics and a multiple-input multiple-output (MIMO) channel rank metric comprising an average MIMO rank metric for subcarriers for each packet, and wherein the means for computing comprises means for multiplying the respective MIMO channel matrices by their respective Hermitians to obtain respective intermediate square matrices, means for computing rank metrics for the subcarriers based on the intermediate square matrices, and means for averaging the computed rank metrics over the subcarriers to obtain the average MIMO rank metric; and
    means for performing the identified adjustments at the station based on the computed parameters including at least the MIMO channel rank metric, wherein performing the identified adjustments comprises using the MIMO channel rank metric and the maximum packet error probability to determine whether more than one spatial stream can be transmitted over a radio link.

45. A non-transitory computer-readable medium, comprising:
    code for causing a computer to acquire information relating to a radio link used for communication, the information indicating one or more impairments, wherein the code for causing the computer to acquire information comprises code for causing the computer to estimate multiple-input multiple-output (MIMO) channel matrices for subcarriers;
    code for causing the computer to identify a maximum packet error probability;
    code for causing the computer to determine a set of parameters to be computed based on the impairments, the set of parameters selected from a list, the list comprising I/Q calibration coefficients, interference cancellation weights, channel truncation values, channel quality indicators and a multiple-input multiple-output (MIMO) channel rank metric comprising an average MIMO rank metric for subcarriers for each packet;
    code for causing the computer to compute the set of parameters based on the acquired information, wherein the code for causing the computer to compute the set of parameters comprises code for causing the computer to multiply the respective MIMO channel matrices by their respective Hermitians to obtain respective intermediate square matrices, code for causing the computer to compute rank metrics for the subcarriers based on the intermediate square matrices, and code for causing the computer to average the computed rank metrics over the subcarriers to obtain the average MIMO rank metric; and
    code for causing the computer to adjust the impairments based on the set of parameters including at least the MIMO channel rank metric, wherein adjusting the impairments comprises using the MIMO channel rank metric and the maximum packet error probability to determine whether more than one spatial stream can be transmitted over the radio link.

\* \* \* \* \*